(12) United States Patent
Werz et al.

(10) Patent No.: US 10,835,989 B2
(45) Date of Patent: Nov. 17, 2020

(54) METHOD FOR FRICTION STIR WELDING AND FRICTION STIR WELDED WORKPIECE

(71) Applicant: UNIVERSITAET STUTTGART, Stuttgart (DE)

(72) Inventors: Martin Werz, Dettingen (DE); Stefan Weihe, Buxheim (DE)

(73) Assignee: UNIVERSITAET STUTTGART (DE)

( * ) Notice: Subject to any disclaimer, the term of this patent is extended or adjusted under 35 U.S.C. 154(b) by 0 days.

(21) Appl. No.: 15/748,560

(22) PCT Filed: Jul. 29, 2016

(86) PCT No.: PCT/EP2016/068167
§ 371 (c)(1),
(2) Date: Jan. 29, 2018

(87) PCT Pub. No.: WO2017/017254
PCT Pub. Date: Feb. 2, 2017

(65) Prior Publication Data
US 2018/0214975 A1 Aug. 2, 2018

(30) Foreign Application Priority Data
Jul. 29, 2015 (DE) .................. 10 2015 112 416

(51) Int. Cl.
*B23K 20/12* (2006.01)
*B23K 20/227* (2006.01)

(52) U.S. Cl.
CPC ........ *B23K 20/1255* (2013.01); *B23K 20/122* (2013.01); *B23K 20/2275* (2013.01); *B23K 20/1265* (2013.01)

(58) Field of Classification Search
CPC ..................... B23K 20/122; B23K 20/1265
See application file for complete search history.

(56) References Cited

U.S. PATENT DOCUMENTS

| | | | |
|---|---|---|---|
| 6,050,474 A | 4/2000 | Aota et al. | 228/112.1 |
| 9,849,541 B2 | 12/2017 | Werz et al. | B23K 20/125 |

(Continued)

FOREIGN PATENT DOCUMENTS

| | | | |
|---|---|---|---|
| CN | 101612690 | 12/2009 | B23K 20/12 |
| DE | 69823746 | 10/2004 | B23K 20/12 |

(Continued)

OTHER PUBLICATIONS

German Office Action (w/translation) issued in application No. 10 2015 112 416.5, dated May 9, 2016 (7 pgs).

(Continued)

*Primary Examiner* — Erin B Saad
(74) *Attorney, Agent, or Firm* — Hayes Soloway P.C.

(57) ABSTRACT

In a method of friction stir welding two pieces of material of greatly differing melting temperatures, provision is made that the first piece of material is overlapped by the second piece of material. The rotating pin of the friction stir welding tool provides for a butt joint welding and an overlap welding at the same time in that the pin is moved along the face side and contacts it either not at all or at most to a minimum extent. The same also applies to the planar side of the first piece of material, which is overlapped by the less stable piece of material.

16 Claims, 14 Drawing Sheets

(56) References Cited

U.S. PATENT DOCUMENTS

| | | | |
|---|---|---|---|
| 2002/0060238 A1 | 5/2002 | Ezumi et al. | 228/112.1 |
| 2003/0000996 A1 | 1/2003 | Satou et al. | 228/112.1 |
| 2003/0024965 A1* | 2/2003 | Okamura | B23K 20/122 |
| | | | 228/112.1 |
| 2003/0102354 A1 | 6/2003 | Okamura et al. | 228/112.1 |
| 2011/0079339 A1* | 4/2011 | Cruz | B23K 20/123 |
| | | | 156/64 |
| 2015/0175207 A1* | 6/2015 | Hata | B23K 20/122 |
| | | | 280/785 |

FOREIGN PATENT DOCUMENTS

| | | | |
|---|---|---|---|
| DE | 60102997 | 4/2005 | B23K 20/12 |
| DE | 102013110034 | 3/2015 | B23K 20/12 |
| EP | 1279458 | 1/2003 | B23K 20/12 |
| JP | 2005324251 | 11/2005 | B23K 20/12 |
| WO | WO2015033074 | 3/2015 | B23K 20/227 |

OTHER PUBLICATIONS

International Preliminary Report on Patentability (w/translation) issued in application No. PCT/EP2016/068167, dated Feb. 8, 2018 (13 pgs).

International Search Report and Written Opinion (w/translation) issued in application No. PCT/EP2016/068167, dated Sep. 29, 2016 (18 pgs).

\* cited by examiner

METHOD FOR FRICTION STIR WELDING AND FRICTION STIR WELDED WORKPIECE

FIELD OF THE INVENTION

The invention relates to a method of friction stir welding a first piece of material to a second piece of material and also relates to a friction stir welded workpiece made of at least two pieces of material.

BACKGROUND

Due to the demand for economical lightweight construction, a composite construction of metal sheets made of different types of metal, for example aluminum/steel, is increasingly made use of in vehicle construction in particular. The different materials have to be joined together in a high-strength manner, which is a challenge for the respective welded joint. The different strengths of the different types of metal make sure that the corresponding metal sheets are of different thicknesses. For example, aluminum sheets with a thickness of 2 mm are usually joined to relatively thin steel sheets from 0.6 mm to 1 mm because the higher-strength steel can have a smaller thickness than the lower-strength aluminum.

It has already been contemplated to flange or to edge the higher-strength piece of material at the welding joint so as to have a larger transition surface in the area of the weld seam. This technology, however, requires a forming process of the higher-strength piece of material, i.e. usually the steel sheet. But there are some grades of steel such as, e.g., martensitic phase steels (22MnB5), which in the hardened state do not have the ductility required for complete forming, so that they can not be used for such a connection. The production of so-called tailor welded blanks from thin steel sheets and somewhat thicker aluminum sheets would be additionally rendered more expensive by the flanging or edging. The advantage of this method, however, is that on the outside, which constitutes the outer skin of the vehicle, for example, there is no noticeable step in the region of the transition between the pieces of material, in this case the metal sheets. The connection of the pieces of material is without steps here.

Moreover, a conventional butt joint also exists between a thicker aluminum sheet and a thinner steel sheet, for example, which may be produced by means of friction stir welding. A drawback of butt joint connections resides in that the surface which is corrugated because of the weld seam and the step that arises due to the different thicknesses of the pieces of material are not located on the same side of the connection, and therefore neither side of the connection can be placed in the visible area of a vehicle body without a finishing operation.

A further friction stir welded joint is an overlap joint, in which the two metal sheets are placed one on top of the other and then welded to each other. However, these overlap joints have the drawback that the connection of the pieces of material is additionally loaded by a bending moment due to the force application points being located spaced from each other. Furthermore, the notch at the edge of the joined area results in low vibration resistance of the joint.

It is therefore the object of the invention to provide a method of friction stir welding two pieces of material having greatly differing melting temperatures, in which, for one thing, the connection is a high-strength joint and, for another thing, a reshaping or forming of the high-strength, and therefore generally thinner, piece of material is not absolutely necessary prior to the welding process. Further, an attempt is to be made to provide a connection between two pieces of material in which an outer surface is produced which in the transition of the pieces of material is configured without a step and a fluting or corrugation and can therefore be used as a visible portion of a component of, e.g., the outer body of a vehicle.

SUMMARY

The invention provides a method of friction stir welding a first piece of material to at least one second piece of material, wherein the first piece of material has a face side and an adjacent planar side which forms a top side or a bottom side of the first piece of material, and has a melting temperature that is higher by at least 250° C., in particular at least 300° C., or more particularly even by at least 350° C., than that of the at least one second piece of material, the method being characterized by the following steps:

(a) the first piece of material is overlapped in sections by at least one second piece of material adjacent to the face side such that at least the second piece of material or one of the second pieces of material is adjacent to the planar side and preferably laterally of the face side; and (b) the first piece of material is butt welded and overlap welded to the second piece of material or one of the second pieces of material by a friction stir welding tool having a rotating pin, by the pin being moved along the face side and the tool being moved along the planar side in the adjacent second piece of material.

In the invention, materials having greatly different melting temperatures and preferably different strengths are joined to each other in that both an overlap welding and a butt joint welding are effected by friction stir welding. The first, usually stronger, piece of material is overlapped by the second piece of material, the second piece of material preferably being adjacent to the first piece of material not only on one side, but on two adjacent sides. The face side of the first piece of material is one side, usually a narrow side, and the so-called planar side (the top or bottom side in the case of a metal sheet), which has a larger area in comparison with the face side, is the other side. The friction stir welding process causes the second piece of material to be welded on both the face side and the planar side, which is overlaid or covered by the second piece of material. The travel path of the pin extends along the face side. Further, the tool is moved along the planar side in the adjacent second piece of material. Even if the second piece of material is not adjacent to the face side before welding, it is reshaped by the tool in such a way that it is welded to the face side. As a result, a butt joint and overlap welding is effected in this case as well.

DE 698 23 746 T2 and JP 2005-32 42 51 A disclose methods of friction stir welding of two pieces of material, these pieces of material overlapping slightly, more specifically on the inside on the side opposite the friction stir welding tool. The reason for this is that one of the workpieces is intended to rest on a shoulder of the other workpiece in order to position the workpieces relative to each other before welding. It is ensured in this way that the two workpieces will adjoin each other on the outside without a step, resulting in a smooth, stepless transition. Starting from this smooth external transition of the two pieces of material, friction welding is performed by the pin penetrating from this side into the workpieces, more specifically into both workpieces in equal shares. The result is a solid weld seam in which the materials of both pieces of material are thoroughly blended. The pin tip penetrates so deeply here that it also covers the overlap area. The weld seam, which is V- or U-shaped in cross-section (as far as it can be delimited from the adjacent material), thus also lies within the original overlap area.

The invention clearly contrasts with this prior art, because the invention provides that the pin does not penetrate both workpieces and thus also a harder workpiece in equal measure, but rather that the pin travels along the face side of the higher-melting piece of material and produces an overlap welding and a butt joint welding at the same time, whereas the prior art provides only one single thick weld seam which no longer exhibits any difference between an overlap joint and a butt joint after the pin has been immersed into both workpieces in equally extensive measure. So while in this prior art the virtual axis of rotation of the pin is located exactly in the transition or in the joint area between the two pieces of material, in the method according to the invention, the pin is extremely heavily laterally offset, because the outer circumference of the pin tip is oriented toward the face side of the more stable, first piece of material and runs past it at a small distance or, at most, scratches the first piece of material to a minimum extent.

Consequently, the original geometry of the first piece of material has been retained in the area of the weld seams in the cross-section of the workpiece produced, since no V- or U-shaped thick weld seam is produced.

The following should be noted with regard to the friction stir welding tool, for it consists of at least one pin and at least one shoulder. The shoulder is that part of the tool which, during welding, rests on the top side of the workpiece produced. Here, the shoulder has a substantially radially or strictly radially extending resting surface. From this surface the pin extends to its tip. In the present invention, the pin itself is preferably provided with a step, i.e. a further substantially radial surface is obtained between the shoulder and the pin tip.

In the method according to the invention, a shoulder may be used which is of a stationary design or of a rotary design. The step on the pin may either be integrally molded with the rotating pin, or it may be a part of the rotating shoulder or an entirely separate part. A further option resides in that the shoulder is also an integral part of the pin and is therefore designed to rotate. Another advantage of the invention is that if the first piece of material is thinner than the second piece of material, which, due to the lower strength of the second piece of material, should normally always be the case when welding metal sheets, the side of the resulting workpiece that is fluted or corrugated by the weld seam lies on that side having the step that results due to the different sheet thicknesses. Therefore, no corrugation can be seen in the visible area, where there is no offset at the transition between the two pieces of material.

Further, a pin may be used which has a pin tip that extends up to the step and a section extending from the step up to a shoulder and having an axial length. The axial lengths and the thicknesses of the first and second pieces of material are matched to each other such that the axial length is greater than the difference between the two thicknesses and a protruding weld seam is produced. This further development of the method is advantageous in particular when the second piece of material does not have a recess complementary to the first piece of material at the edge thereof, so that additional material is available during welding. This material fills the area up to the shoulder so that a protruding weld seam is formed. Up to now, it has been proposed in the prior art that the thicker and usually softer upper piece of material be pressed down to its original thickness in the overlap area, which, however, requires high axial forces and causes excessive friction work combined with excessive heat input. This may have an adverse effect on strength and elongation at fracture. Further, this technique may lead to a weld concavity. The above-mentioned use of a specially matched pin will avoid these drawbacks. These advantages are especially effective when welding metal sheets, i.e. flat, plate-shaped parts having a constant thickness. The raising of the seam does preferably not result from additional sheet layers or integrally molded thickened portions, but from the original overlap of the pieces of material, in particular the metal sheets. In cases in which the second piece of material has a recess complementary to the first piece of material at the edge thereof, additional sheet layers or integrally molded thickened portions may be used in an area to be welded and overlapping the first piece of material, so that additional material is available for producing a protruding weld seam. In case the upper, second piece of material has a recess on its lower side to accommodate the edge of the first piece of material, the thickened portion is provided, e.g., on the upper side in the region of the recess and, if necessary, laterally beyond it.

In the method according to the invention, a filler material may be supplied externally, which, however, is not necessarily the case. The friction stir welding process may also be carried out without any filler material whatsoever.

One embodiment of the invention provides that at least 90%, preferably at least 95%, of the pin is moved in the second piece of material, in particular that the pin is moved completely in the at least one second piece of material without contacting the face side and/or the planar side of the first piece of material. This means that the pin stirs almost exclusively or even exclusively only in the second piece of material, which has a lower melting temperature than the first piece of material. Nonetheless, this produces an excellent friction stir welding joint, as tests have shown, although the higher-melting first piece of material is at most "scratched" by the pin. Alternatively or additionally, in the welding process the pin and/or a step of the pin may be moved along a path which, on the one hand, is defined by the profile of the face side or of the planar side of the first piece of material based on the still non-welded condition, and, on the other hand, has a path width amounting to +/− 10% of the thickness of the non-welded piece of material in the region of the face side. This means that there is a kind of spatial corridor that is predefined for the feed movement of the pin, which is predefined by the profile of the face side and of the planar side of the first piece of material in the non-welded condition thereof. With respect to a horizontal first piece of material, this corridor is defined in both the horizontal and vertical directions, more specifically by the face side and, respectively, by the planar side defining the top surface in the welding area. The pin moves along the planar side by its step. The pin moves along the face side by the peripheral surface of its pin tip. In particular, the above-mentioned path or the above-mentioned corridor extends in the region from contact with the face side and the planar side up to a maximum depth of penetration of 0.1 mm into the first piece of material, i.e. the pin only slightly scratches or scrapes the first piece of material superficially at most.

In contrast to the above-mentioned prior art, in the method according to the invention, the friction stir welding is preferably carried out—more specifically along the above-mentioned paths or corridors—in such a way that the different materials of the first and second pieces of material are not blended. However, tests have revealed that this type of friction stir welding leads to excellent mechanical strength properties. Alternatively, a minimum, very thin diffusion layer of a thickness of 0.5 mm maximum, preferably of a thickness of 0.1 mm maximum or even as small as 0.05 mm maximum, may be produced upon scratching.

As discussed above, the pin preferably has a step which faces the planar side and provides for the overlap welding. At the same time, the butt joint welding is performed by the pin tip projecting from the step. As discussed, the step may be an integral part of the pin, an integral part of a stepped, rotating shoulder, or a separate part.

A particularly low-wear variant provides that the friction stir welding tool is advanced toward the planar side only so far that softened material of the at least one second piece of material is permanently present between the tool shoulder and the planar side of the first material itself. The second material, which has a lower melting temperature, thus serves as a lubricant and coolant between the tool shoulder and the planar side of the first material, which has a higher strength and usually is harder as well. Therefore, a contact between the tool and the first piece of material implies an increase in wear.

Preferably, a pin is employed that has a pin tip having an axial length which, as measured from the free end of the pin up to the step of the pin, substantially corresponds to the thickness of the first piece of material at the face side thereof. The first piece of material may, of course, also become thicker where it is remote from the welded face side; there is no compelling reason to provide an always constant thickness. While this is uncommon when welding two metal sheets, the method according to the invention is not limited to the welding of two metal sheets.

Rather than using a pin that is designed with a step and which in a traversing movement will perform butt welding and overlap welding at the same time, these two welding processes may also be effected in succession by one or more pins, with the pin responsible for the overlap welding being moved on the face side along the planar side. This means in this case that the free, face-side end of the pin scratches the planar side of the first piece of material or travels closely along it, and that, here too, softened material of the second piece of material is preferably always present as a coolant and lubricant between the tool shoulder and the planar side.

A preferred embodiment of the invention, however, provides that the first piece of material and the at least one second piece of material are in the form of flat plates, i.e. metal sheets, at least in the welding area, preferably throughout. The method according to the invention is particularly suitable for vehicle body construction.

A particularly simple and low-cost option of welding two pieces of material that are plate-shaped in the welding area to each other or of welding two metal sheets to each other consists in that the second piece of material, in relation to the first piece of material, extends obliquely to the face side along a so-called transition edge and additionally also obliquely to the planar side, projecting over the latter. The transition edge is the edge resulting between the face side and the planar side. This can be explained more easily by way of an example. If the first piece of material is a metal sheet, it is placed flat onto a base. The second piece of material is then placed, on the one hand, onto the base and, on the other hand, onto the transition edge, so that this second piece of material projects obliquely upward from the base up to the transition edge and then still further over the first piece of material and thus also beyond the planar side thereof. This necessarily results in a gap between the bottom side of the second piece of material and the planar side located below it. A gap is also produced between the face side and that part of the second piece of material which is spaced laterally thereof and does not contact the face side. This means that in the original condition, the second piece of material contacts neither the planar side nor the face side and, therefore, does not contact the areas to be welded. The friction stir welding tool will, however, apply pressure to deform the second piece of material toward the planar side, overlap welding and butt welding it. The pressure applied by the friction stir welding tool, in the axial direction of the pin, presses the second piece of material, which, in fact, moreover is heated during welding and thereby becomes soft, into the above-mentioned gaps, which are thus completely filled. In spite of the original oblique position of the second piece of material, after the welding a transition is obtained between the pieces of material which is characterized by a smooth, step-free and gap-free outer skin and thus a smooth transition between the two pieces of material on the outer skin.

It is also possible in this connection to arrange the second piece of material at a small distance from the transition edge prior to welding, which is then no longer relevant during welding because the pressure applied by the friction stir welding tool is so high that the two pieces of material will still be welded. This variant is especially suitable if a working or machining of the second piece of material in the region of the edge of the first piece of material is to be avoided.

Preferably, the second piece of material is one single workpiece, for example a metal sheet. An alternative embodiment, however, provides that a plurality of second pieces of material are provided, which more particularly are of the same material. One of the second pieces of material here is adjacent to the first piece of material on the face side and is butt welded to it. A further second piece of material lies over, or rests on, the planar side and is then overlap welded to the first piece of material. Advantageously, in the welding process the butt welding and the overlap welding are performed at the same time. Further, the two second pieces of material are friction stir welded to each other. In addition, using this variant it is also possible very simply to achieve a thickness compensation between the thin, first piece of material and the usually thicker, second piece of material. In that case, a thin second piece of material, which may even be very narrow, is simply placed on the face side of the first piece of material in order to provide a welding material for the overlap welding.

The portion of the second piece of material overlapping the first piece of material along the flat side need not be completely overlap welded to the flat side of the first piece of material, but may be overlap welded thereto only in sections. An edge strip of the second piece of material is obtained toward the free end edge which is then formed; the edge strip is not welded to the first piece of material. This edge strip is severed after the welding process, in particular by machining or quite simply by tearing it off.

Such tearing off or other removal can be facilitated in that during overlap welding a wormhole is deliberately generated, more specifically at the transition of the overlap-welded section and the edge strip; the edge strip is then severed along the wormhole. In simplified terms, the wormhole may be regarded functionally as a perforation.

Preferred material pairings for the first and second pieces of material are steel (first piece of material) and aluminum or copper (second piece of material) or copper for the first piece of material and aluminum for the at least one second piece of material.

The materials that can be used for the first and/or the second piece of material may also be wrought or cast materials.

Especially when steel sheets are used, they are often zinc-plated. This applies primarily to the flat side. The invention provides that the friction stir welding tool is axially advanced during welding such that the zinc layer remains intact in the non-welded area, as this area may get into contact with moisture which could lead to corrosion.

When reference is made to the same materials, these, on the one hand, actually also comprise identical materials; on the other hand, optionally certain variants of alloys or differences in alloys are also included. For example, when a plurality of second pieces of material is used, one may be of an aluminum alloy having magnesium as its main alloying component and the other may be of an aluminum alloy having silicon as its a main alloying component.

According to the invention, the friction stir welding tool has a shoulder which may be rotary or stationary, and a pin tip extending up to a radial step, with the pin having a cylindrical section again, after the radial step, the cylindrical section then extending to the shoulder. Preferably, the axial length of the pin tip is 0.8 to 1.2 times as large as the thickness of the first piece of material in the area of the welding (the thickness is measured in the non-welded state of the first piece of material).

The axial length of the pin, measured from the shoulder to the end of the pin, should be in the range of 0.8 to 1.2 times the thickness of the second piece of material in the area of the butt welding, of course also measured before welding.

Furthermore, numerous tests have shown that it is of advantage that the difference in diameter between the diameter of the cylindrical part of the pin between the step and the shoulder and the pin tip is equal to or greater than twice the material thickness of the first piece of material in the area of the weld seam (also measured before welding).

Further, the diameter of the tool in the region of the shoulder should be 1.5 to 2.5 times the diameter of the pin in the region between the step and the shoulder.

In the extensive tests carried out by Applicant, these conditions have turned out to be optimal.

What is important to the present invention is the exact welding path which is covered by the tool relative to the workpieces. As already discussed above, the face side of the overlapped first piece of material should at most be "scratched" by the pin. In order to avoid that the pin travels past the face side too far away from it or penetrates too deeply into the first piece of material, one configuration of the invention provides for a measurement of the edge of the first piece of material located below the second piece of material. Here the edge, to be welded, of the first piece of material is measured before or after placing the second piece of material and/or before or during moving the pin. Depending on this measurement, the advancing movement of the pin in relation to the direction toward the first piece of material is open- or closed-loop controlled. Here, not only the position of the edge can be detected, but also its profile over the whole area to be welded or over sections thereof.

Measurement methods for this are tactile or contactless, e.g. by means of a laser scanner, image acquisition or by ultrasound. In particular, the first workpiece is fixed in a processing position, then measured and finally welded in the existing fixing position.

A further advantageous method relates to further processing of the pieces of material welded to each other, in particular in sheet metal working. When the workpiece that has been produced by welding is subsequently punched, it is placed on a cutting tool base, more particularly by its planar side. The same also applies to a forming process, i.e. a bending of the workpiece. The so-called good part side, i.e. that side of the part that will later be used, should rest on the base.

Finally, the invention relates to a workpiece, having a first piece of material and at least one second piece of material friction stir welded to the first piece of material, wherein the first piece of material has a face side and an adjacent planar side which forms a top side or a bottom side of the first piece of material, and has a melting temperature that is higher by at least 250° C. than that of the at least one second piece of material, and the first piece of material is butt welded on the face side to the at least one second piece of material and is overlap welded on the planar side to the, or one, second piece of material, wherein the different materials of the pieces of material are not blended in the welding area.

In the workpiece according to the invention, provision is made that the different materials do not blend in the welding area, that a minimum, very thin diffusion layer of a thickness of 0.5 mm maximum, preferably of a thickness of 0.1 mm maximum or even only 0.05 mm maximum, is produced upon scratching, which makes the workpiece stand out clearly from the prior art.

The weld seam has an L-shaped form in cross-section, with one leg forming the butt joint weld seam and the other forming the overlap weld seam.

In addition, the workpiece itself may also include many other advantageous features that have already been mentioned in connection with the above-mentioned method according to the invention, including, among others, the material thicknesses and material pairings.

BRIEF DESCRIPTION OF THE DRAWINGS

FIG. 22 shows a sectional view of a variant of the friction stir welding tool used in the invention, in which a filler material is made use of;

DETAILED DESCRIPTION

Figure 1:
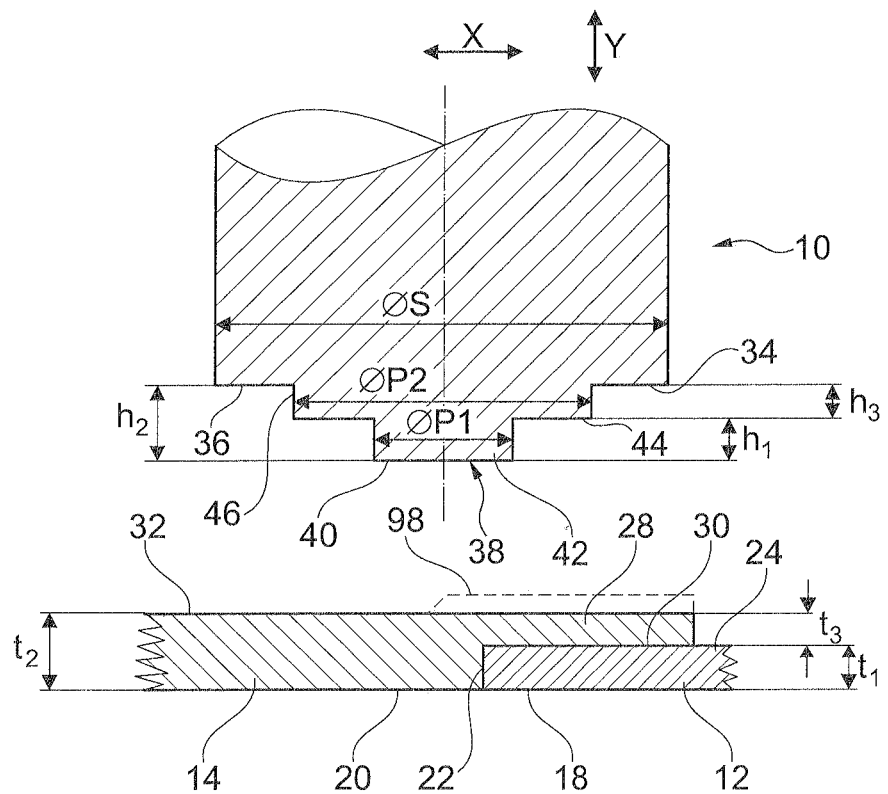
FIG. 1 shows a cross-sectional view of a friction stir welding tool prior to advancing it against the pieces of material.

FIG. 1 illustrates a friction stir welding tool 10 which is used for friction stir welding a first piece of material 12 and a second piece of material 14 to each other.

The first piece of material 12 has a melting temperature that is higher by at least 250° C., in particular by at least 300° C. or even by at least 350° C., than that of the second piece of material 14, which for this reason is designed to be thicker than the first piece of material 12.

In the present case, the two pieces of material are metal sheets; the potential materials therefor will be listed at the end of the description by way of example for all of the embodiments.

The first and second pieces of material are placed flat next to each other on a counter-support 16 (see FIG. 2), so that their bottom sides 18, 20 lie next to each other without a step.

The first piece of material 12 has a face side 22, which faces the second piece of material 14, and a top side 24.

As can be seen in FIG. 1, the second piece of material 14 has an edge-shaped extension 28, by which it protrudes over the first piece of material 12, overlapping it here. In the illustrated embodiment, the face side 22 preferably rests against the corresponding opposite face side of the second piece of material 14; likewise, the bottom side of the extension 28 is in surface contact with, and rests on, the top side of the first piece of material 12. That area of the top or bottom side 24 or 18 which is opposite the projecting portion, in this case the extension 28, will be referred to as planar side 30 of the first piece of material below. The bottom side 18 and the top side 24 constitute the larger surface area sides as compared with the face side 22.

FIG. 1 also shows that a recess is formed in the second piece of material 14 toward the bottom side by the extension 28, the recess being filled by the first piece of material 12.

In the embodiment shown, the second piece of material 14 also has a planar shape on its top side 32, that is, there is no jump in cross-section in the area of the transition to the extension 28.

The thickness of the first piece of material 12 in the area of the planar side 30 is t1; the thickness of the second piece of material 14 in the area of the face side 22 is t2.

The friction stir welding tool 10 has geometries matched to these dimensions. These geometries relate, among other things, to a so-called shoulder 34, which constitutes a substantially radially extending contact surface 36 by which the welding tool is in contact with the top side of the workpiece, which is formed by the pieces of material 12,14, during the friction stir welding process.

In addition, the friction stir welding tool includes a pin 38 extending from the shoulder 34 and the contact surface 36 thereof to the free end 40 of the pin 38. The pin 38 has a pin tip 42 extending up to a radial step 44, and a subsequent preferably cylindrical second section 46, which then extends up to the shoulder 34.

The axial length of the pin tip 42 is h1 with a diameter P1. The second section 46 has a diameter P2, and the shoulder has a diameter S in the area of the contact surface 36. The length of the pin 38 from the contact surface 36 to the end 40 is h2.

The dimensions are selected such that:
h1=0.8 to 1.2×t1;
h2=0.8 to 1.2×t2;
(P2−P1)/2≥t1; and/or
S=1.5 to 2.5×P2.

During welding, the tool 10 is advanced in the axial direction Y toward the two pieces of material, which should be clamped, and after the pin has penetrated the material, the tool is moved along a path or along a distance.

Figure 2:
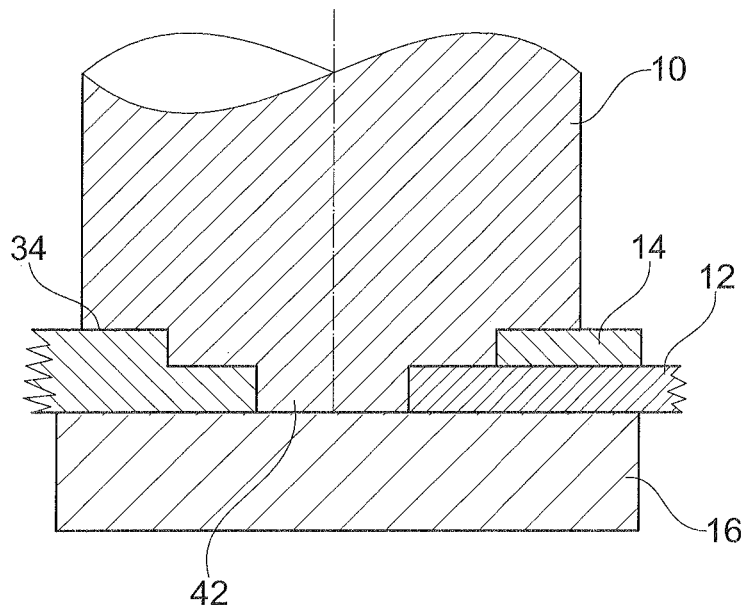
FIG. 2 shows the friction stir welding tool according to FIG. 1 while carrying out the friction welding process according to the invention and welding the pieces of material shown in FIG. 1.

FIG. 2 shows that the tool 10 has penetrated the pieces of material 12, 14 and stir-welds the two pieces of material to each other. The position of the tool in the horizontal direction X and in the axial direction Y is adjusted to the face side 22 and the planar side 30 in such a way that the outer circumference of the pin tip 42 moves very closely along the face side 22 with, at most, a minimum amount of contact. In the vertical direction Y, the tool 10 is advanced such that the step 44, that is, its radial contact surface 36, travels closely along the planar side 30, contacting it to a minimum extent at most. This means that the tool 10 penetrates the first piece of material 12 to a minimum at most, if at all, to weld both pieces of material 12, 14 to each other.

The shape of the pin causes the pieces of material 12, 14 to be both butt welded and overlap welded; in the embodiment according to FIGS. 1 and 2, this occurs simultaneously. The face side 22 is butt welded and the planar side 30 is overlap welded.

The path along which the tool 10 is moved can be defined in different ways.

At least 90%, preferably at least 95%, of the pin 38 is moved in the second piece of material 14; this can be determined most easily in the sectional view according to FIGS. 1 and 2. In fact, in relation to the starting position of the pieces of material 12, 14, the position of the pin 38 while it travels is such that with a projection of the pin 38 into the pieces of material 12, 14 as related to the position of the tool 10 during welding (FIG. 2), 90% or more of the cross-sectional area of the pin 38 is located in the second piece of material 14.

But the pin and thus the tool 10 can also be moved along the face side 22 and the planar side 30 without contact with the face side 22 and the planar side 30, i.e. along the edge of the first piece of material 12, in order to carry out the welding process.

The width of the path along which the tool 10 and the pin 38 are moved amounts to +/− 10% of the thickness t1. The center of this path is defined by the position of the face side 22 in the X-direction and the position of the planar side 30 in the Y-direction.

In particular, provision is made that the path should be in the region from contact of the face side 22 and/or the planar side 30 with the pin 38 up to a maximum depth of penetration of the pin 38 of 0.1 mm into the piece of material 12.

In order to avoid that the pin 38 travels along the face side 22 at too large a distance from it or penetrates too deeply into the piece of material 12, a measurement of the edge of the piece of material 12 located below the second piece of material 14 may be performed, the term "edge" being intended to include both the edge as the transition of the face side 22 to either the top or the bottom side of the piece of material 12 and the face side 22 itself. Here, the edge of the piece of material 12 is measured in a tactile or a contactless manner, e.g. by means of a laser scanner, image acquisition, by ultrasound or any other suitable measuring method, before or after placing the second piece of material 14 and/or before or during traversing the pin 38. Depending on this measurement, the advancing movement of the pin in relation to the direction toward the first piece of material is then open-loop or closed-loop controlled. Not only the position of the edge can be detected here, but also its profile over the whole area to be welded or over sections thereof.

For example, an ultrasonic probe may be used for measuring even when the piece of material 14 has already been placed on the piece of material 12. To this end, the probe is placed on the piece of material 12, e.g., to the right next to the edge of the piece of material 14 with reference to FIGS. 1 and 4.

Prior to the measurement, the workpiece 12 is fixed in a processing position, then measured and finally welded in the existing fixing position.

In the present friction stir welding process, the different materials of the pieces of material 12, 14 are not blended, which is an essential difference from the prior art. In fact, this applies to all embodiments which will still be discussed below.

Welding of the pieces of material 12, 14 to each other produces a workpiece in which on the flat side (bottom side according to FIG. 1), no corrugation or fluting is visible at the outer side, which, with reference to FIG. 1, defines the bottom side of the pieces of material 12, 14. Besides, this also applies to the other embodiments. Here, too, that side of the workpiece which is designed without steps will not show any fluting or corrugation after friction stir welding.

What is important in advancing the friction stir welding tool 10 in the Y-direction is that it is advanced towards the planar side 30 only so far that softened material of the second piece of material 14 is permanently present between the step 44 and the planar side 30, so that this material is available as a lubricant and coolant. This also applies correspondingly to the following embodiments.

The pieces of material 12, 14 need of course not be in the form of flat plates which are appropriately adjusted to each other only in the area of the overlap. Workpieces having any desired shapes may also be welded to each other.

Figure 3:
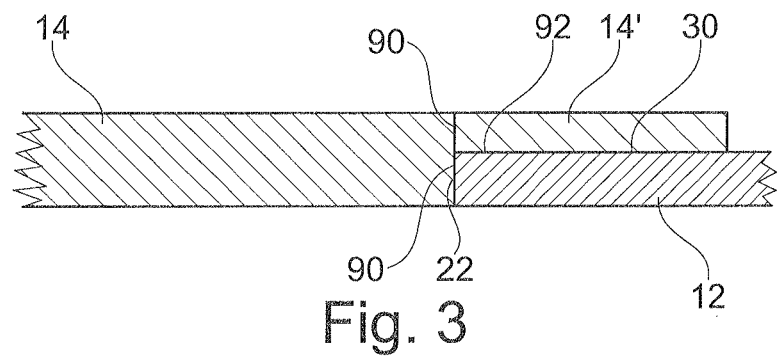
FIG. 3 shows a plurality of pieces of material placed side by side and on top of each other in accordance with a different variant, before and after the friction stir welding according to the invention.

In the embodiment according to FIG. 3, a plurality of second pieces of material 14, 14' are employed, which are made of the same material or of slightly different materials but which have, in any case, a melting temperature that is lower by at least 250° C. than that of the first piece of material 12. In the embodiment according to FIG. 3, the extension 28 according to FIG. 1 is formed as a separate part, namely, by a second piece of material 14', so that the respective step or the respective depression need not be configured in the piece of material 14 but, rather, two pieces of material 14, 14' having different thicknesses are simply placed next to each other, and the piece of material 14' completely, i.e., precisely, or substantially compensates the difference in thickness of the first piece of material 12 in relation to the second piece of material 14.

As already mentioned above, when the tool 10 is advanced, the material of the piece of material 14' is always present between the step 44 and the planar side 30 here as well, so that the softened material serves for lubrication and cooling. But, using the friction stir welding process, the piece of material 14 and the piece of material 14' are also butt welded to each other at the same time. In the finished condition, there is therefore a layer of the second piece of material 14' which is overlap welded to the planar side 30.

Figure 4:
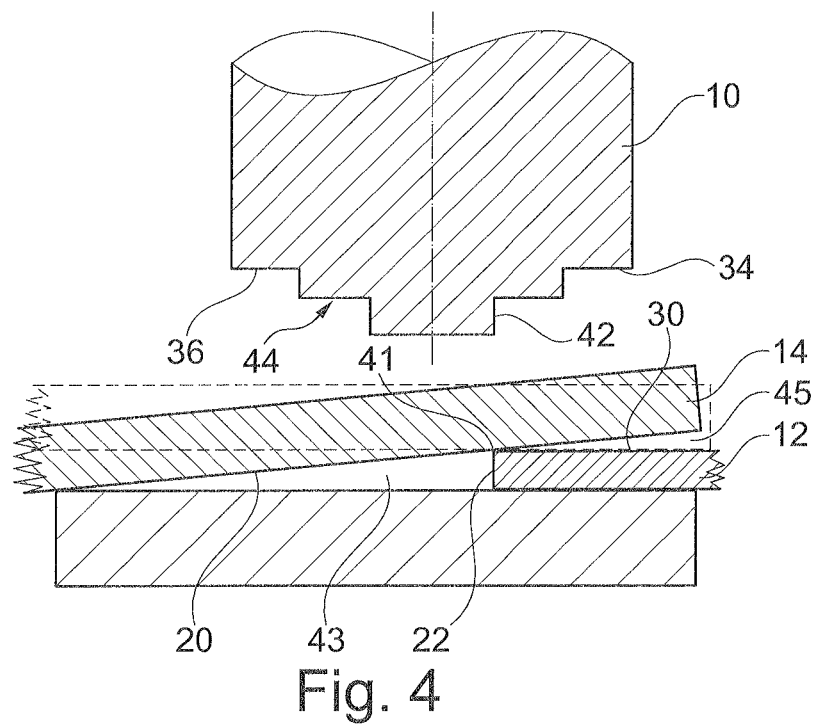
FIG. 4 shows a further variant of pieces of material positioned in relation to each other prior to the friction stir welding according to the invention, along with the friction stir welding tool.
Figure 5:
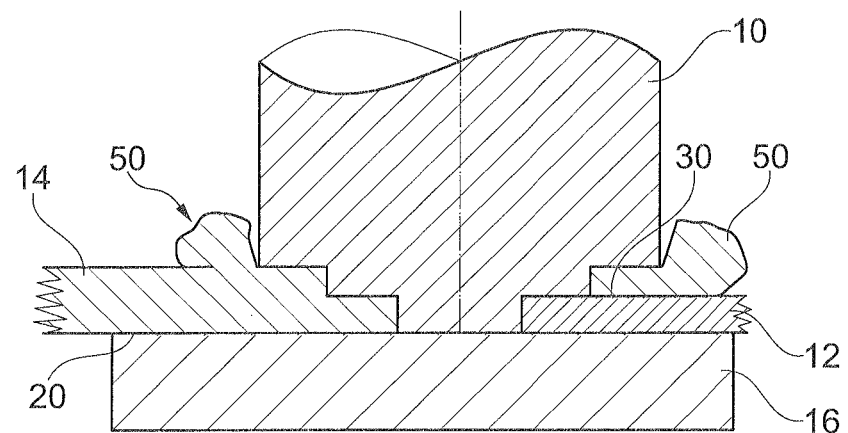
FIG. 5 shows the friction stir welding according to the invention with the workpieces according to FIG. 4.

FIGS. 4 and 5 show a particularly simple variant of the invention, which, in fact, requires neither two second pieces of material 14, 14' nor a second specially shaped piece of material 14, as is shown in FIG. 1, which is designed with a recess or a step to accommodate the first piece of material 12 therein. At least in their adjoining areas, both pieces of material are substantially or completely flat, that is, formed in the nature of sheet metal, or are generally two metal sheets that are flat essentially in the welding area or completely flat.

The second piece of material 14 is placed, on the one hand, on the counter-support 16 and, on the other hand, on the first piece of material in the region of the transition edge 41, which may also be rounded, between the face side 22 and the planar side 30. The second piece of material thus extends obliquely upward from the counter-support and, therefore, opposite the face side 22 in this region, even though with the formation of a gap 43. When it reaches the transition edge 41, the second piece of material 14 overlaps the first piece of material 12 and extends opposite from the planar side 30, again forming a gap 45 here. The gaps 43 and 45 are, however, not relevant to the method of friction stir welding since the tool 10 is moved axially, i.e. in the Y-direction, against the second piece of material 14 such that the latter is deformed and the bottom side 20 rests on the counter-support 16 over its entire surface and, after the overlap welding, is now welded to the planar side 30 over its entire surface as well. This can be seen in FIG. 5. The butt joint, i.e. the butt welding, already discussed above, is also obtained in the region of the face side 22, so that the gap 43 here does also not constitute a drawback for carrying out the method. If required, any material 50 that has been displaced is then severed.

As in the other embodiments, here, too, a workpiece is produced in which an overlap welding takes place over the entire surface below the shoulder 34 in the region of the planar side 30 and, in addition, a butt joint welding takes place along the entire face side 22.

Figure 6:
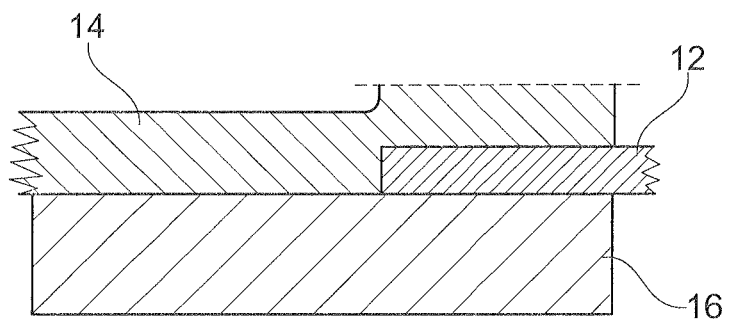
FIG. 6 shows a further variant of first pieces of material placed on top of each other, in which a pre-stamping occurs and which are subsequently friction stir welded in accordance with the invention.

While in the embodiment according to FIGS. 4 and 5, the second piece of material placed obliquely on the first piece of material 12 is deformed exclusively under the action of the pressure and the rotation of the tool 10, the embodiment according to FIG. 6 provides for an intermediate step. That is, after the second piece of material 14 has been placed obliquely on the first piece of material 12, as is apparent from FIG. 4, it is pressed against the counter-support 16 by means of a pressing tool and is deformed in the process, so that the gaps 43, 45 are filled or reduced by the material of the second piece of material 14. For example, this can also result in a step in the second piece of material 14, the step projecting on the top side of the second piece of material 14. Following this intermediate step in accordance with the method, friction welding is then carried out as is shown in FIG. 5, for example. This forming or reshaping step may, for example, also be performed by a roll or a die as in a stamping process and not only by the tool 10 as illustrated in FIG. 5.

As an alternative thereto, rather than placing the second piece of material on the counter-support 16 to have it extend obliquely upward as far as over the piece of material 12, it is also possible that it is arranged in parallel and above the piece of material 12. But the tool 10 appropriately deforms the second piece of material 14 and also provides for the welding according to FIG. 5.

Figure 7:
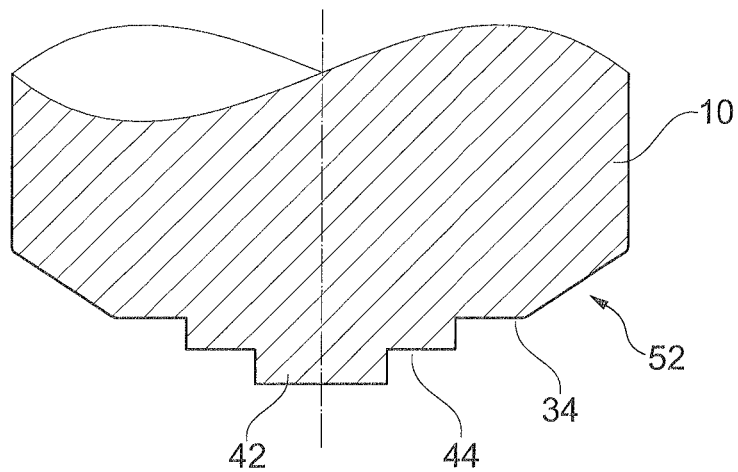
FIG. 7 shows a cross-section of a variant of the friction stir welding tool employed in the method according to the invention.

FIG. 7 shows a variant of the tool 10 in which the shoulder 34 is conically chamfered on the outer edge, facing away from the pin tip 42. The resultant chamfer 52 serves as a run-in zone and may function as a run-in zone especially in the case of non-prestamped second pieces of material 14, as is illustrated in FIG. 4, for example. That is, when moving the tool 10, that portion of the piece of material 14 that is adjacent to the tool 10 is pushed into the run-in zone formed by the chamfer 52 and is plastically deformed in the Y-direction toward the counter-support 16, with the increase in temperature, of course, also possibly helping in the forming process as the proximity to the virtual axis of rotation of the pin 38 increases. The run-in zone may be realized not only by a bevel, but also by a radius or a spiral or worm shape of the tool in this area.

Figure 8:
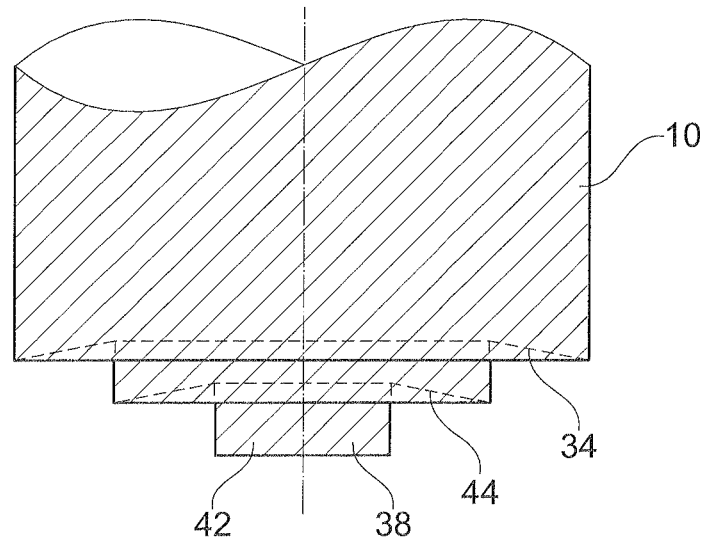
FIG. 8 shows a cross-section of a further variant of the tool employed in the friction stir welding method according to the invention.

FIG. 8 shows a further variant of the tool 10 in which both a conically chamfered shoulder 34 and a step 44 having a concave radial surface are formed. Here, a respective angle between 0 degrees and 20 degrees relative to the corresponding radial surface may be realized.

It is, of course, not required to overlap weld the entire part of the second piece of material 14 that protrudes over the piece of material 12. In the embodiment according to FIG. 9, the overlapping section of the second piece of material is welded to the piece of material 12 only up to a line 58, so that a non-welded edge strip 60 up to the so-called free end edge 62 of the second piece of material is produced in the overlapping area. This edge strip 60 is removed by cutting, for example, e.g. by means of a side milling cutter, a forming cutter or an end mill 64. This saves costs and weight for the workpiece and reduces notch stresses that may impair the vibration resistance.

Figure 10:
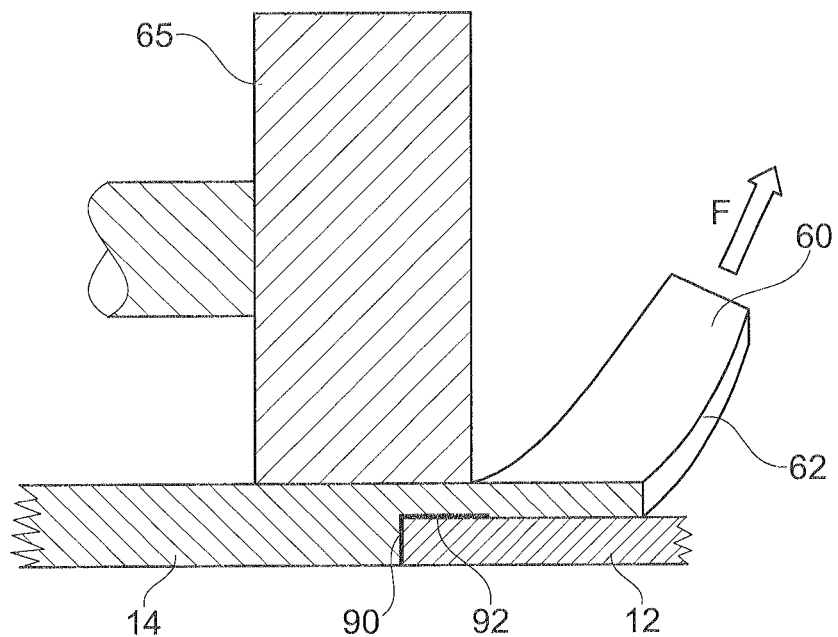
FIG. 10 shows the workpiece according to the invention during the severing of the non-welded area.
Figure 11:
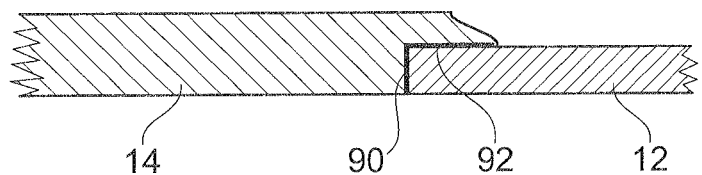
FIG. 11 shows the workpiece according to the invention after severing the non-welded area, the severing here being effected by tearing it off.

Alternatively, the edge strip 60 may also be severed by one or more successive non-rotating cutting edges, in which the individual cutting edges have an increasing cutting depth. FIGS. 10 and 11 illustrate that the edge strip 60 may also be torn off, for example by a supporting roller or cutting roller 65 pressing against the welded, overlapping section of the piece of material 14 and the edge strip 60 being torn off by applying a force F, so that the workpiece shown in FIG. 11 is obtained. Tearing off reduces the risk that the first piece of material 12 is damaged by a cutting operation.

Figure 12:
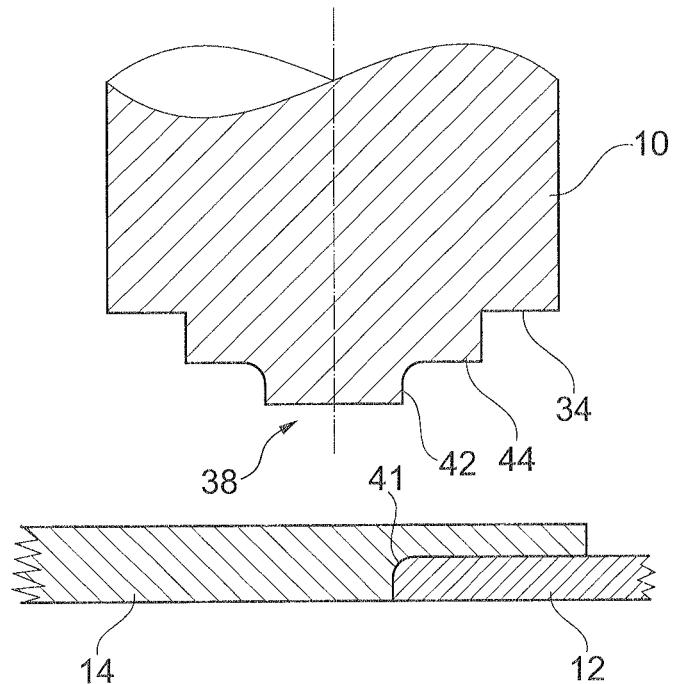
FIG. 12 shows a further variant of pieces of material lying on top of each other, which are friction stir welded in accordance with the invention, with the pin being shaped differently than in the previous embodiments here.

Since the first piece of material 12 is stiffer than the second piece of material 14, a stress concentration occurs at the transition of the pieces of material, in particular at the transition edge 41 visible in FIG. 4. The deformation of the first workpiece 12 can be reduced by rounding the edge 41, as is shown in FIG. 12, and by an appropriately shaped, rounded transition between the pin tip 42 and the step 44. Alternatively, the transition edge 41 may also remain unrounded, and the transition between the pin tip 42 and the step 44 may be rounded. Then the transition edge 41 is reshaped when it is machined by the pin.

The welded workpiece can already be seen in FIG. 12.

As already discussed in detail above, the shoulder 34 may be rotating or non-rotating, or it may transition into the pin 38 in one piece.

Figure 13:
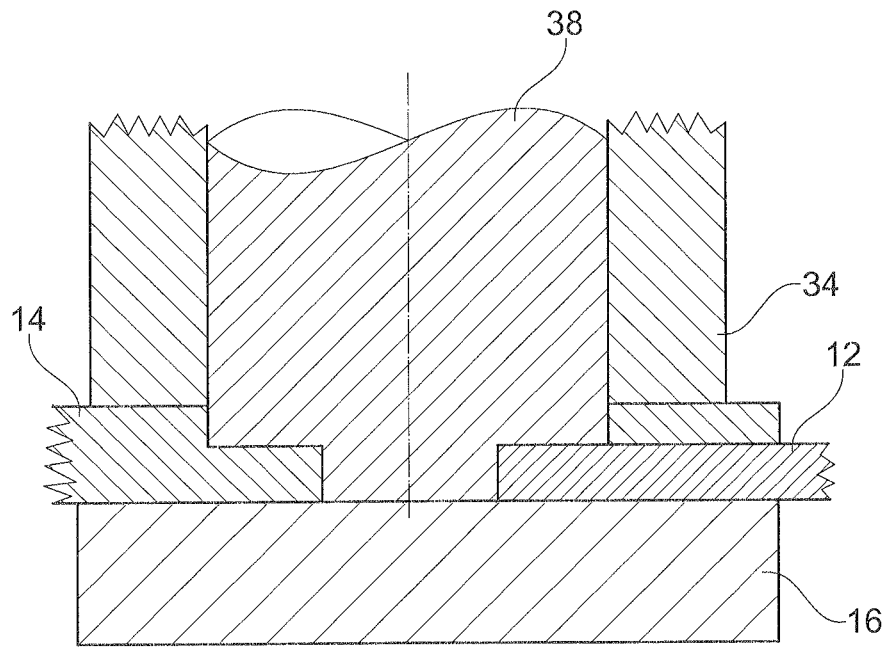
FIG. 13 shows a further variant of the tool employed in the method according to the invention.

In the embodiment according to FIG. 13, the shoulder 34 is configured as a separate part, i.e. the pin 38 protrudes through the shoulder 34 that terminates like a sleeve.

In the embodiments of the tool 10 shown above, in which the pin 38 continued into the shoulder in one piece, a large diameter of the shoulder was obtained, resulting in a comparatively wide weld seam.

In the embodiment according to FIG. 13, on the other hand, the shoulder 34 is either non-rotating or rotating slowly. In spite of a pin 38 having a comparatively large diameter, relatively narrow weld seams can be produced with it. An additional advantage of the embodiment according to FIG. 13 resides in the low heat input due to the non-rotating shoulder. The heat affected zone can thus be reduced and the strength of the weld seam can be increased.

To be able to weld second pieces of material 14 of different thicknesses to a first piece of material 12 of an always constant thickness, the shoulder 34 can be shifted axially relative to the pin 38. In this case, force application may be effected via an actuator or a preloaded spring.

Altogether, three areas of the pin 38 and the shoulder 34 ensue, namely the area of the pin tip 42, the area of the step 44, and the area of the shoulder 34 with the corresponding contact surface 36. These three sections can be combined with each other as desired. As already discussed, the shoulder 34 may transition into the pin 38 in one piece, or the shoulder 34 may be configured separately from the pin 38, as shown in FIG. 13. In addition, the shoulder 34 may, of course, also be integrally connected with the step 44, and the pin 38 may rotate separately therefrom; in this case the shoulder 34 must also rotate with the step 44 in order to produce the overlap welding.

Figure 14:
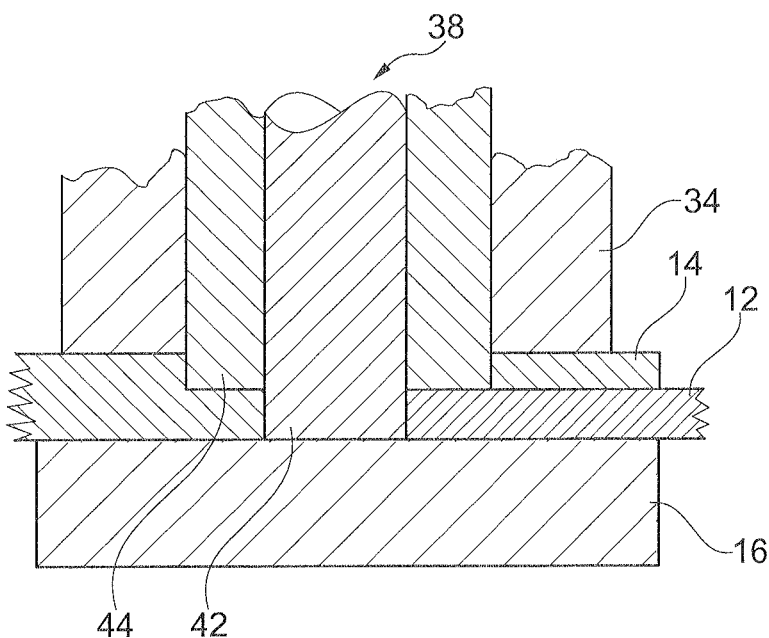
FIG. 14 shows yet a further variant of the friction stir welding tool employed in the method according to the invention.

FIG. 14 shows that the three areas are formed by three different parts. The shoulder 34, for example, is formed like in FIG. 13, whereas the pin 38 is in two parts. An inner part forms the pin tip 42 and an adjoining, sleeve-shaped second part forms the step 44, which rotates independently of the pin tip 42. The three parts may also be moved axially in relation to each other as desired in order to allow a compensation for different thicknesses of the pieces of material 12, 14. In this case, too, the shoulder 34 may, of course, also rotate, for example independently of the pin tip 42 and of the step 44.

Figures 15A, 15B:
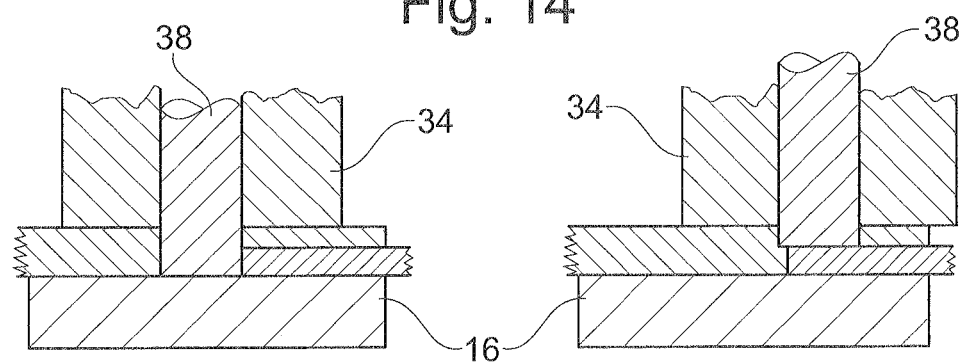
FIGS. 15a and 15b show two successive method steps for sequential overlap and butt joint welding according to a variant of the invention.

While in the above-described embodiments of the method, the overlap welding and the butt joint welding were carried out simultaneously using one pin, in the embodiment according to FIGS. 15a and 15b a sequential overlap welding and butt joint welding is proposed, for example by means of the same pin. According to FIG. 15a, the pin is advanced to a lower position relative to the shoulder 34, so that it performs the butt joint welding. Subsequently, the pin 38 is slightly retracted in relation to the shoulder 34, making it protrude less in relation to the shoulder 34. In this position, the overlap welding is then carried out, as is illustrated in FIG. 15b.

In general, of course, the adjustability of the pin 38 relative to a stationary shoulder 34 or one that is generally separated therefrom is advantageous in order to allow the depth of penetration of the pin 38 into the pieces of material 12, 14 to be set precisely and to prevent the pin 38 from contacting the counter-support 16 by its end 40. The configuration according to FIG. 14 allows a position control of the shoulder 34, the pin tip 42 and the step 44 relative to each other and to the workpiece.

Figure 16:
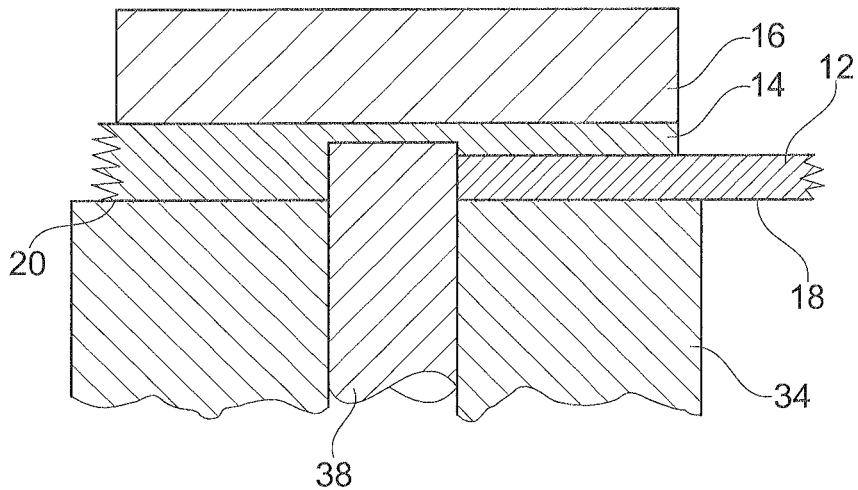
FIG. 16 shows a further variant of the method according to the invention.

As a variant to the configuration according to FIG. 15a, the butt joint according to FIG. 16 may, of course, also be effected from the bottom side 18, 20. This has the advantage that the butt joint connection does not require root penetration. This also eliminates the risk of the counter-support 16 coming into contact with the pin 38. This variant also makes it easier to compensate for variations in the thicknesses of the pieces of material 12, 14.

Even if the shoulder 34 is a separate part from the pin 38, it may possibly rotate slowly to counteract sticking of the shoulder and to reduce the process forces in the advancing direction.

For manufacturing so-called tailored blanks from strip material, a tool is especially convenient through which the material passes and in which the welding tool is not moved in the advancing direction, but only the strip material. In this case, the corresponding counter-support 16 preferably is a roll having a large roll diameter; lateral support elements in the form of rollers or the like may, of course, also prevent the workpieces from yielding in relation to each other. It is, of course, a further optimum solution in this context if the non-welded edge strips mentioned above can be severed automatically right away.

Figure 17:
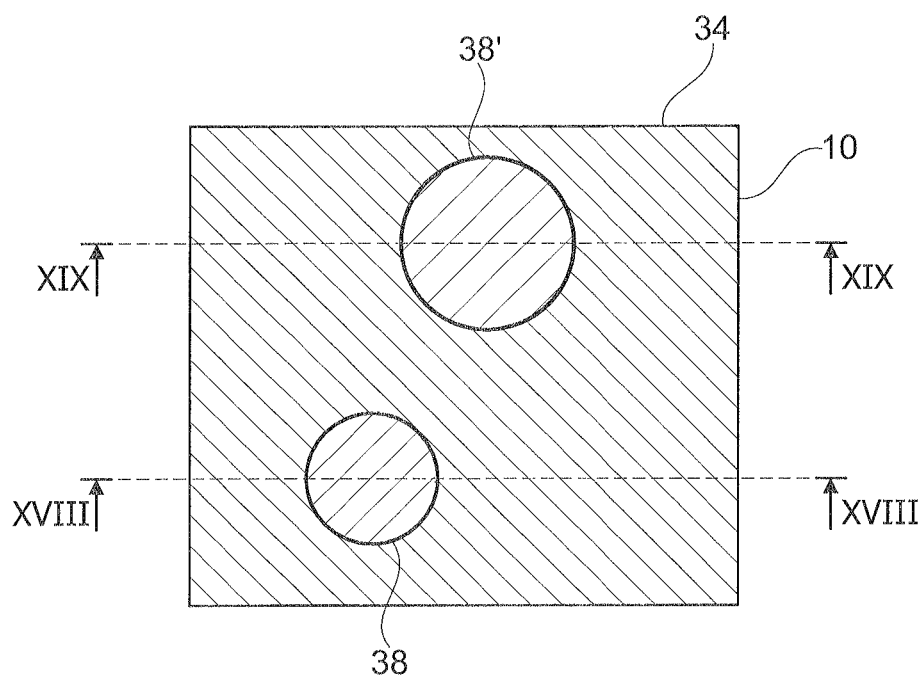
FIG. 17 shows a top view of a variant of a friction stir welding tool having offset pins for carrying out the method according to the invention.
Figure 18:
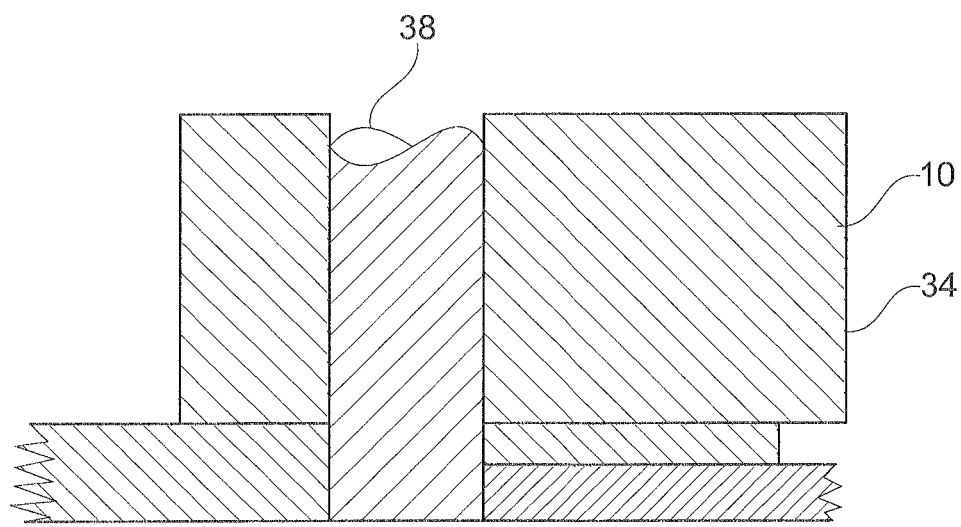
FIG. 18 shows a sectional view of the friction stir welding tool according to FIG. 17 along the line XVIII-XVIII.
Figure 19:
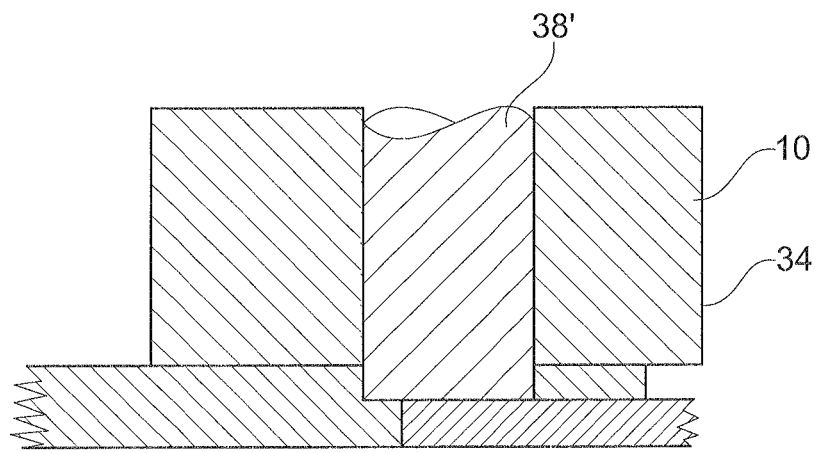
FIG. 19 shows a sectional view of the friction stir welding tool according to FIG. 17 along the line XIX-XIX.

One variant for the sequential butt joint and overlap welding according to FIGS. 15a and 15b is illustrated in FIGS. 17 to 19. Here, two pins 38 are arranged in a tool 10 which are provided slightly offset and slightly behind each other in the advancing direction and which use the same shoulder 34. One pin 38 is responsible here for the butt joint and one pin 38' is responsible for the overlap welding. Both pins 38, 38' can be driven by a shared motor or separately.

Preferably the pin 38 is moved in a position-controlled or automatically position-controlled manner and the pin 38' in an automatically force-controlled manner.

Figure 20:
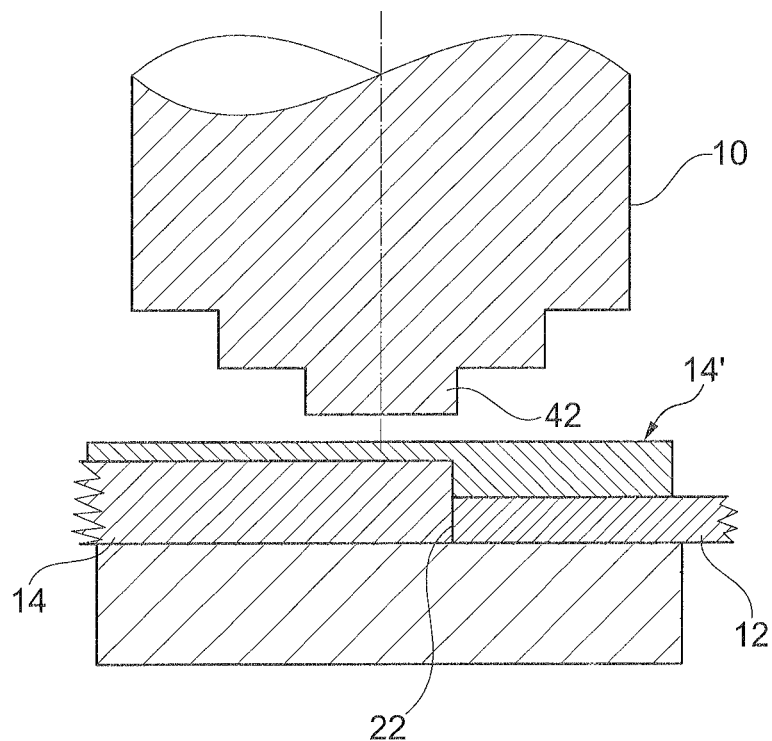
FIG. 20 shows a further variant of pieces of material lying on top of each other, which are friction stir welded in accordance with the invention.

The variant according to FIG. 20 is an alternative to the configuration according to FIG. 3, in which two second pieces of material 14, 14' are used, with the piece of material 14 here also extending only up to the face side 22, whereas the piece of material 14' is available for the overlap welding. Unlike in FIG. 3, however, the piece of material 14' overlaps the piece of material 14 as well, so that an overlap welding is additionally also generated in this overlapping area, more specifically between the pieces of material 14 and 14'. The piece of material 14' can be produced particularly easily here by an extruded profile. In this variant, the joint strength is still further increased; in particular, high-strength aluminum alloys can be made use of here for the extruded profiles.

Figure 21A:
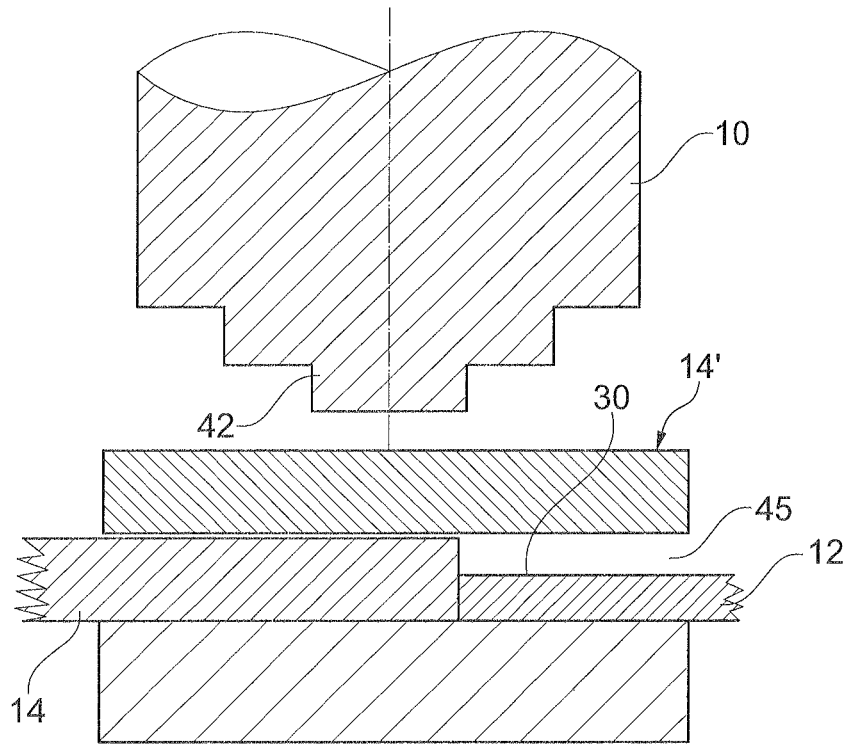
FIGS. 21a and 21b again show a further variant of pieces of material placed on top of each other, which are friction welded to each other by the method according to the invention; more specifically prior to advancing the welding tool and during friction stir welding, respectively.
Figure 21B:
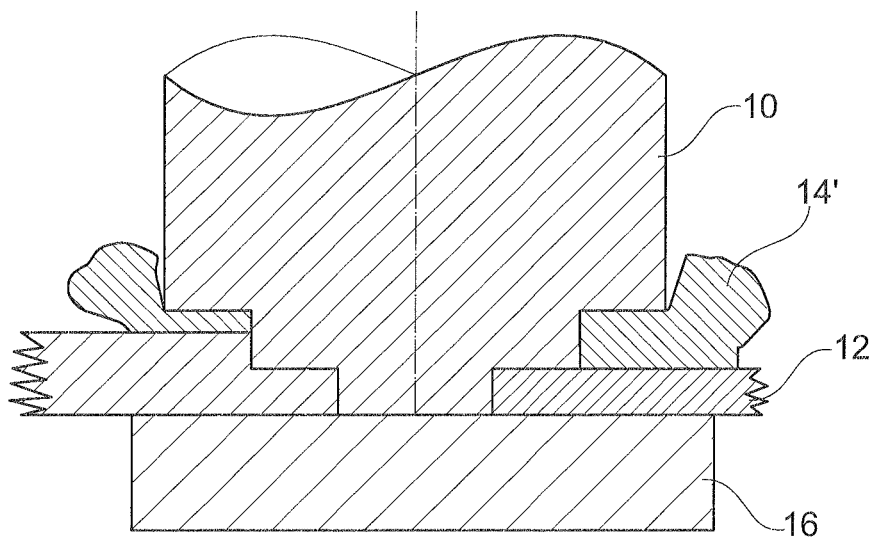

As an alternative to these extruded profiles, the piece of material 14' may also be designed as a flat metal sheet which rests on the piece of material 14 so that a gap 45 is produced between the side 30 and the bottom side of the piece of material 14', the gap being however eliminated during friction stir welding, as shown in FIG. 21b.

Figure 22:
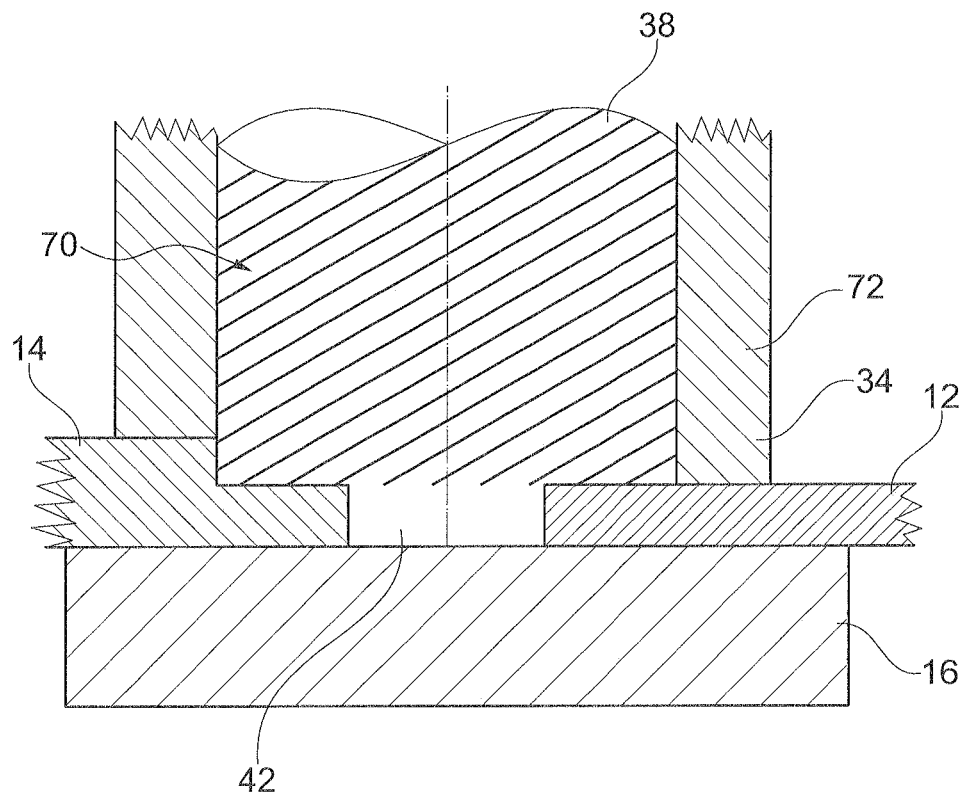

FIG. 22 shows a design variant having a non-rotating shoulder 34, in which, however, additional material is transported to the pin tip 42 via an effectively conveying structure 70 on the outer circumference of the pin 38, which material serves for welding.

Figure 9:
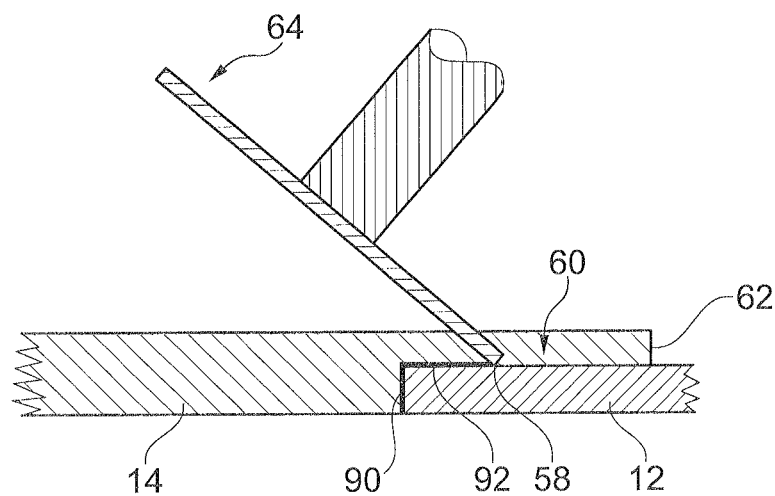
FIG. 9 shows the workpiece according to the invention after the friction stir welding process during the severing of the non-welded area.
Figure 23:
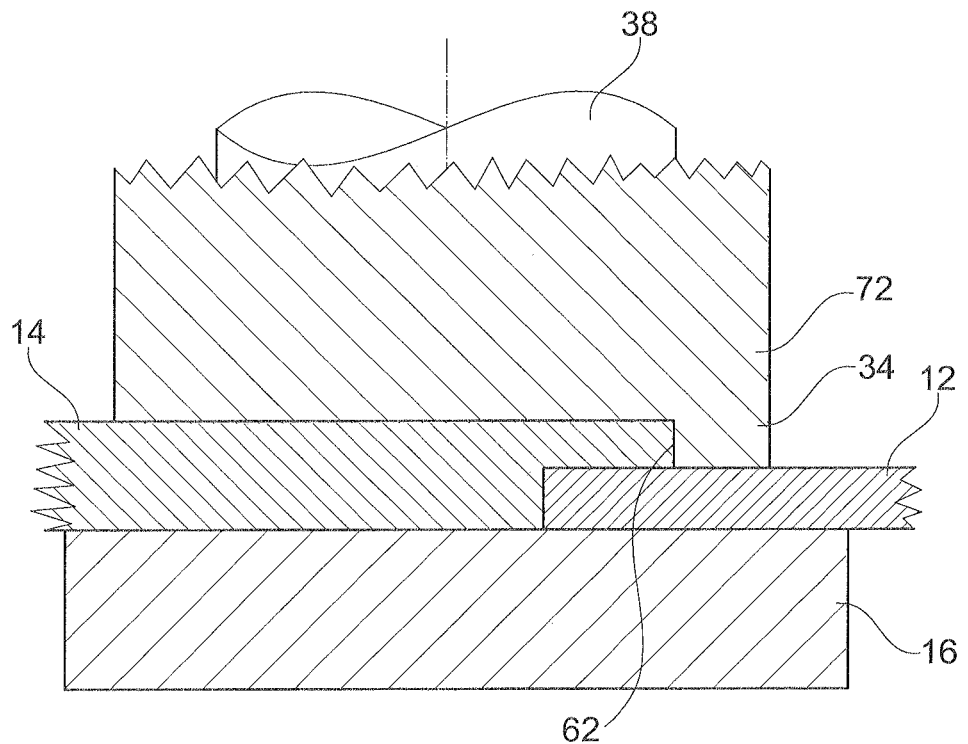
FIG. 23 shows the friction stir welding tool according to FIG. 22 during the welding process in a side view.

In the embodiment according to FIGS. 22 and 23, the shoulder 34 has an extension 72 projecting downward, which is adjacent to the end edge 62 and delimits the so-called stirring zone. In this way, no non-welded edge strip arises, as is illustrated in FIG. 9. In this embodiment, the shoulder 34 is, of course, non-rotating. The variants according to FIGS. 22 and 23 may, of course, also be combined with each other. Further, it is also possible to provide an effectively conveying structure 70 on the inside of the sleeve-shaped shoulder 34.

Figure 24:
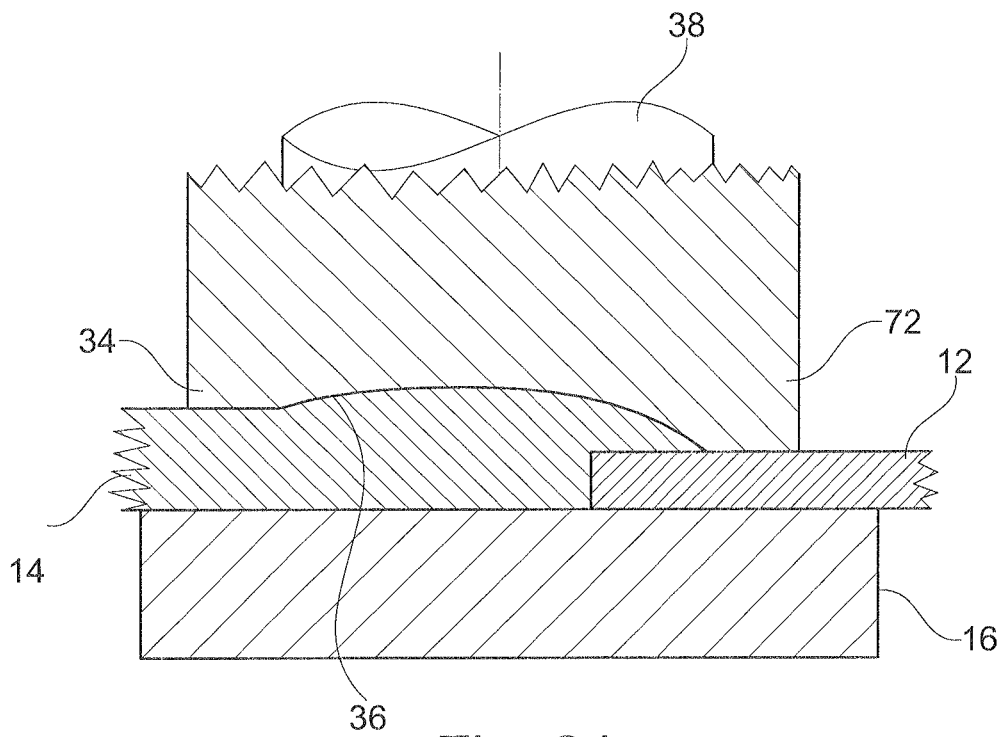
FIG. 24 shows the friction stir welding tool according to FIG. 23 in a slightly modified form while the method according to the invention is carried out.

The embodiment according to FIG. 24 differs from the one according to FIG. 23 in that the shoulder 34 has an optimized surface or shape on its contact surface 36, with an extension 72 being provided here as well. The shape of the shoulder 34 or, more precisely, of its contact surface 36 is slightly concave here, so that the weld seam obtained has a greater thickness in the middle than at the edges. Furthermore, the second piece of material continuously tapers off to a thickness of 0 in the overlap area.

Figure 25:
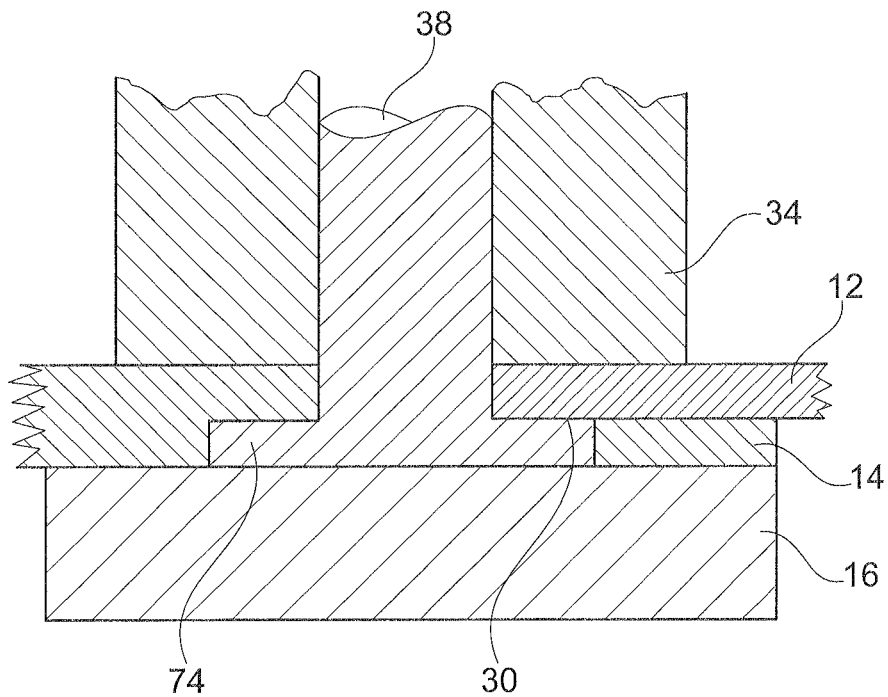
FIG. 25 shows yet another variant of the friction stir welding tool while carrying out the method according to the invention, here with a so-called stepped pin.

Due to assembly sequences and lack of accessibility, it may in some circumstances be impossible to weld from the side opposite the first piece of material 12. In such a case, the variant shown in FIG. 25 can be employed, which includes a so-called inversely stepped pin 38 which has a disk-shaped widened portion 74 at its end, which is used for overlap welding, whereas the adjacent part of the pin is used for butt joint welding. When it is immersed into the material, the pin 38 should first be immersed into the soft, second piece of material 14 and only then approach the first piece of material 12 in order to avoid or minimize any prior contact with it. As in the other embodiments, it is applicable here as well that preferably the material of the second piece of material should always be present between the tool, in this case the widened portion 74, and the side 30 of the first piece of material at which the overlap welding takes place.

Figure 26:
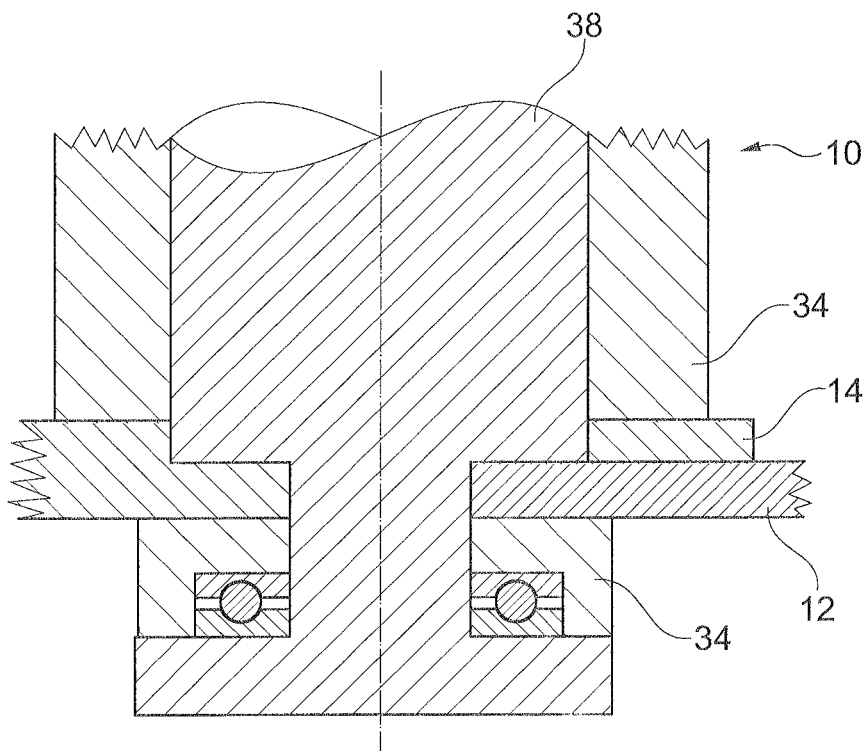
FIG. 26 shows a further variant of the tool which may be employed in the method according to the invention, in this case a so-called double shoulder tool with stepped pin.

There are examples of workpieces in which it is not possible to use counter-supports in welding. Such a variant using a double-shoulder tool with a stepped pin 38 is shown in FIG. 26. Due to the internal force flow, the axial force components of both shoulders 34 cancel each other out. FIG. 26 thus shows a variant in which the first piece of material 12 is welded to the second piece of material 14 without a counter-support.

The Figures below show a few other advantageous variants of the embodiments already mentioned above.

Figure 27:
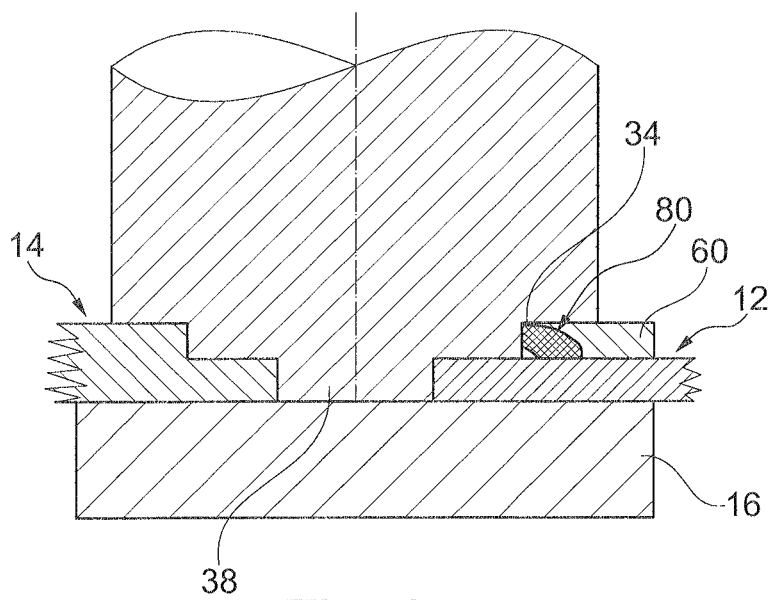
FIG. 27 shows a cross-section of the workpiece according to the invention when the method according to the invention is carried out and when a wormhole is produced.

FIG. 27 shows that in order to make it easier to tear off (see FIG. 10) the non-welded edge strip 60, a wormhole 80 may be deliberately incorporated, which runs along the welding line, more particularly at the transition between the pin 38 and the shoulders 34. This wormhole functions like a perforation.

Alternatively to this, the non-welded edge strip 60 could of course also be bonded to the first piece of material 12 in order to reduce the susceptibility to crevice corrosion.

Figure 28:
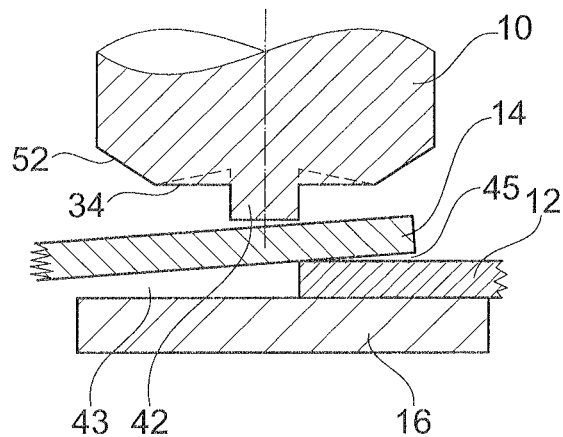
FIG. 28 shows a variant of the embodiment according to FIG. 4 using the same metal sheet thicknesses and an altered tool.
Figure 29:
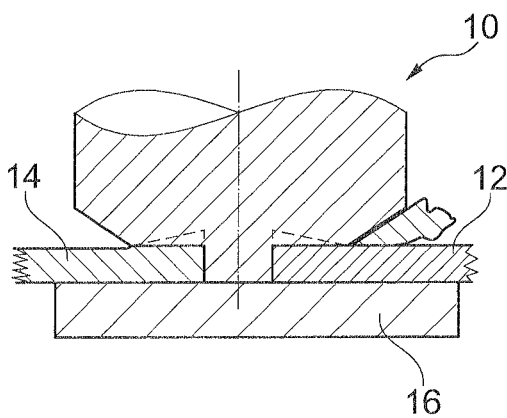
FIG. 29 shows the method according to the invention during friction stir welding of the sheets according to FIG. 28.

FIGS. 28 and 29 show a variant of the embodiment according to FIG. 4 or 5, in which the two pieces of material 12, 14 are of equal or substantially equal thickness. The tool used here is a pin without a step, in which the shoulder 34 is provided, on the one hand, with the chamfer 52 and, on the other hand, with a concave indentation on the contact surface 36, as is illustrated in FIG. 8. In this case, too, the second piece of material 14 could, of course, be pre-stamped or pressed on before it is welded. Preheating of the overlapping part of the second piece of material 14, e.g. by induction, is advantageous to assist the deformation of the second piece of material in the overlap area and in the area of the gaps 43, 45.

In order to allow large lateral tolerances in the positioning of the pieces of material 12, 14, generally an automatic transverse force control of the tool is particularly favorable. This means that the tool 10 is moved along the desired weld seam after penetrating the pieces of material 12, 14. The position transverse to the longitudinal direction of the weld seam is selected such that the force in this direction is constant and corresponds to a specified value. That is, the force transverse to the longitudinal direction of the weld seam is the controlled variable, whereas the position along the welding direction, i.e. along the weld seam, constitutes a control variable.

Figure 30:
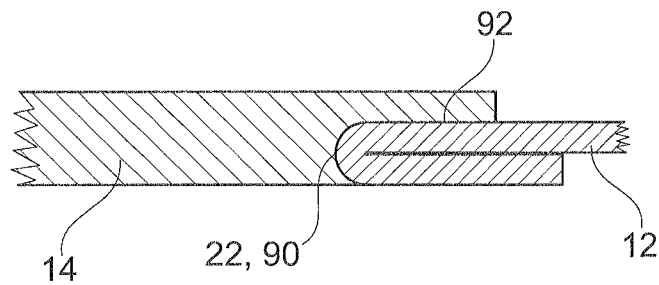
FIG. 30 shows different metal sheets lying on top of each other, before and after the method according to the invention is carried out.
Figure 31:
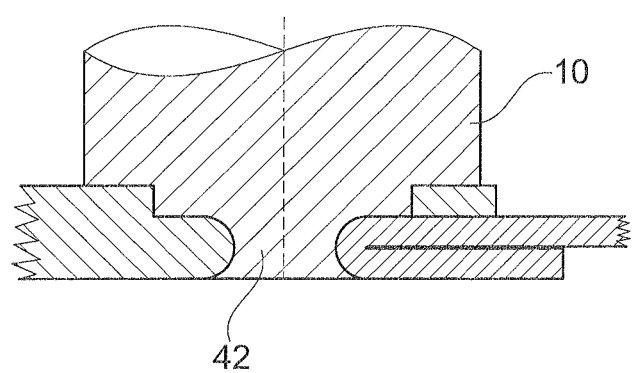
FIG. 31 shows the method according to the invention, in which the metal sheets illustrated in FIG. 30 are friction stir welded.

FIGS. 30 and 31 show the pieces of material 12, 14, the piece of material 12 being thickened by bending or flanging or folding at its free edge to be welded. The face side 22 is thus obtained in the region of the folding. This region is usually rounded in cross-section for manufacturing-related reasons, the pin tip 42 then preferably having a complementary shape, i.e. having a convex peripheral wall.

The workpiece welded accordingly can be seen in FIG. 30.

In general, here too, the following applies to all embodiments:

If the first piece of material 12 is coated, for example in the region of the planar side 30, the friction stir welding tool 10 is axially advanced during welding such that this layer remains intact in the non-welded area so that it can continue to be effective as a protection from corrosion.

The preferred materials are steel for the first piece of material and aluminum or copper or its alloys for the second piece of material, or copper for the first piece of material and aluminum or alloys thereof for the second piece of material.

The materials may be provided as wrought materials or else as cast materials, among others. The coating is zinc, in particular for the piece of material 12 made of steel.

The overlapping of the two pieces of material 12, 14 before welding provides sufficient material for the welding process and, in addition, this reduces the formation of wormholes and facilitates a good connection of the materials. The overlapping allows large lateral tolerances to be permitted, that is, tolerances in the X-direction between the pieces of material 12, 14, i.e. the face side 22 may have no contact or only partial contact with the second piece of material 14 along its entire length before welding.

Figure 32:
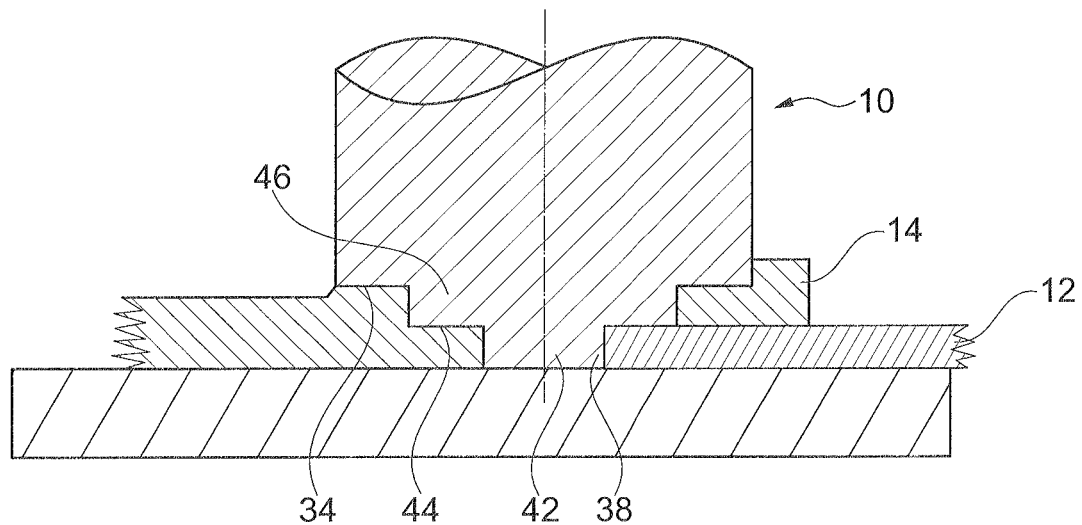
FIG. 32 shows a further variant of the method according to the invention.
Figure 33:
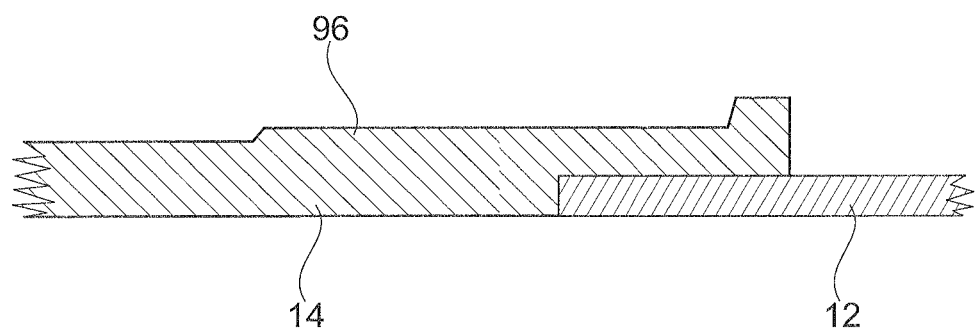
FIG. 33 shows the workpiece produced according to the invention and in accordance with the method shown in FIG. 32.

In the embodiment according to FIGS. 32 and 33, a pin 38 is used which has an overly long section 46. The section 46 extending from the step 44 up to a shoulder 34 has an axial length h3 (see FIG. 1), the axial length h3 and the thicknesses t2 and t1 of the second piece of material 14 and the first piece of material 12 being adjusted to one another such that the axial length h3 is equal to or greater than the difference between the thicknesses t2-t1 and a protruding weld seam is produced. This method is used in particular for two metal sheets to be welded which lie one on top of the other according to FIG. 4; generally speaking, this means that the piece of material 14 does not have a recess that is complementary to the piece of material 12 at the edge thereof, as is shown in FIG. 1, so that additional material is available during welding.

In cases in which the second piece of material 14 has a recess complementary to the first piece of material 12 at the edge thereof, as shown in FIG. 1, additional sheet metal layers or integrally formed thickened portions (see, e.g., thickened portion 98 in FIG. 1 in broken lines) of the second piece of material 14 can be used in the area to be welded and overlapping the piece of material 12, so that additional material is available to produce a protruding weld seam.

This material fills the area up to the shoulder 34 (see FIG. 32), so that a protruding weld seam 96 (see FIG. 33) is formed. The raising of the weld seam 96 preferably does not result from additional sheet metal layers or integrally formed thickened portions, but from the original overlap of the pieces of material 12, 14, in particular the metal sheets. This variant can, of course, also be combined with the other variants, which were discussed above.

In both cases, both with and without a complementary recess, this additional material can furthermore be made use of to fill and close a gap that may possibly exist between the face side 22 of the first piece of material 12 and the corresponding opposite face side of the second piece of material 14.

FIGS. 3, 9, 10, 11 and 30 show welded workpieces in accordance with the invention. It is well visible that both the face side 22 and the planar side 30 have retained their original geometries here, so that the butt joint weld seam or its welding area 90 can actually be delimited from the overlap weld seam 92 or the welding area thereof (L-shaped profile of the weld seams or welding areas relative to each other). Here, there may be either no blending of the materials at all, or a minimum, very thin diffusion layer of a thickness of 0.5 mm maximum, preferably a thickness of 0.1 mm maximum or even only 0.05 mm maximum, is produced upon scratching (corresponding to the welding area 90 and the seam 92).

The invention claimed is:

1. A method of friction stir welding a first piece of material to at least one second piece of material, wherein
the first piece of material has a face side and an adjacent planar side which forms a top side or a bottom side of the first piece of material, and has a melting temperature that is higher by at least 250° C. than that of the at least one second piece of material, wherein a single second piece of material is provided having a thickness greater than the thickness of the first piece of material or a plurality of second pieces of material are provided which are stapled onto each other so that the staple has a higher thickness than the first piece of material, characterized by the following steps:

(a) the first and second pieces of material are arranged next to each other so that the face sides of the first piece of material and the side face of the single second piece of material or one of the second pieces of material are arranged next to each other, the first piece of material is overlapped by a sidewardly protruding portion of the single second piece of material or by one of the second pieces of material such that the single second piece of material or the staple of the second pieces of material is adjacent to the planar side and laterally of the face side; and (b) the first piece of material is butt welded and overlap welded to the second piece of material or one or more of the second pieces of material by a friction stir welding tool having a rotating pin, by the pin being moved along the face side and the tool being moved along the planar side in the adjacent second piece of material, wherein the pin has a step which faces the planar side and provides for the overlap welding simultaneously with the butt joint welding generated by the pin tip projecting from the step.

2. The method according to claim 1, wherein at least 90% of the pin is moved in the second piece of material.

3. The method according to claim 1, wherein during the friction stir welding, the different materials of the pieces of material are not blended, or wherein a diffusion layer of a thickness of 0.5 mm maximum is produced upon scratching.

4. The method according to claim 1, wherein a pin is used which has a pin tip that extends up to the step and a section extending from the step up to a shoulder and having an axial length, the axial length and the thickness of the second piece of material and the thickness of the first piece of material being matched to each other such that the axial length is equal to or greater than the difference of the thickness of the second piece of material minus the thickness of the first piece of material and a protruding weld seam is produced.

5. The method according to claim 1, wherein the pin has a shoulder and wherein the friction stir welding tool is advanced toward the planar side only so far that softened material of the at least one second piece of material is permanently present between the shoulder and the planar side of the first material during butt welding.

6. The method according to claim 1, wherein the pin has a pin tip having an axial length as measured from the pin end up to a step of the pin, the axial length substantially corresponding to the thickness of the first piece of material at the face side thereof.

7. The method according to claim 1, wherein the overlap welding and the butt joint welding are effected in succession by one or more pins, with the pin responsible for the overlap welding being moved on the face side along the planar side.

8. The method according to claim 1, wherein the first piece of material and the at least one second piece of material are in the form of flat plates at least in the welding area.

9. The method according to claim 1, wherein a second piece of material is formed so as to be flat at least in the welding area and, in relation to the first piece of material, extends obliquely to the face side along a transition edge between the face side and the planar side and also obliquely to the planar side to project over the latter, and that the friction stir welding tool simultaneously overlap welds and butt welds while applying pressure towards the planar side.

10. The method according to claim 9, wherein the second piece of material is placed obliquely onto the first piece of material, contacting the transition edge.

11. The method according to claim 1, wherein the sidewardly extending portion of the second piece of material overlapping the first piece of material along the flat side is overlap welded to the flat side of the first piece of material only in sections and has an edge strip toward its free end edge, the edge strip not being welded to the first piece of material, the edge strip being severed after the welding process.

12. The method according to claim 11, wherein in the overlap welding process, a wormhole is produced at the transition of the overlap welded section and the edge strip, the edge strip being severed along the wormhole.

13. The method according to claim 1, wherein the first piece of material is made of steel and the at least one second piece of material is made of aluminum or copper, or the first piece of material is made of copper and the at least one second piece of material is made of aluminum.

14. The method according to claim 1, wherein the first piece of material is zinc-plated on the planar side in the overlap welded section, wherein the friction stir welding tool is axially advanced during welding such that the zinc layer remains intact in the non-welded area.

15. The method according to claim 1, wherein an edge, to be welded, of the first piece of material is measured before or after placing the second piece of material and/or before or during moving the pin and, depending on the measurement, the movement of the pin in relation to the direction toward the first piece of material is open- or closed-loop controlled.

16. A method of friction stir welding a first piece of material to second pieces of material, wherein the first piece of material has a face side and an adjacent planar side which forms a top side or a bottom side of the first piece of material, and has a melting temperature that is higher by at least 250° C. than that of the at least one second piece of material, characterized by the following steps:

(a) providing a plurality of second pieces of material being of the same material, (b) arranging one of the second pieces of material having a face side with the face side next to the face side of the first piece of material, wherein the first piece of material has a thickness that is smaller than that of the second piece of material which is arranged adjacent to the face side of the first piece of material, (c) arranging a further second piece of material on the planar side of the first piece of material which compensates for the difference in thickness of the first and second pieces of material arranged adjacent to their side faces, both second pieces of material further are contacting each other with their face sides, and (d) wherein the first piece of material is butt welded to the adjacent second piece of material at the adjacent face sides by a friction stir welding tool having a rotating pin, by the pin being moved along the face sides, and the friction stir welding tool being moved along the planar side of the first piece of material to overlap weld the further second piece of material and the first piece of material.

\* \* \* \* \*